(12) United States Patent
Zhang et al.

(10) Patent No.: US 12,152,146 B2
(45) Date of Patent: Nov. 26, 2024

(54) SILICONE SEALER COMPOSITIONS

(71) Applicant: 3M INNOVATIVE PROPERTIES COMPANY, St. Paul, MN (US)

(72) Inventors: Enzhong Zhang, Shanghai (CN); Lianzhou Chen, Woodbury, MN (US); Shaomin Sun, Shanghai (CN); Xinxin Sun, Shanghai (CN); Shaoqing Gu, Shanghai (CN); Jianhua Tang, Shanghai (CN); Jonathan D. Zook, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 898 days.

(21) Appl. No.: 17/259,015

(22) PCT Filed: Aug. 15, 2018

(86) PCT No.: PCT/CN2018/100644
§ 371 (c)(1),
(2) Date: Jan. 8, 2021

(87) PCT Pub. No.: WO2020/034117
PCT Pub. Date: Feb. 20, 2020

(65) Prior Publication Data
US 2021/0284841 A1    Sep. 16, 2021

(51) Int. Cl.
*C08L 83/04* (2006.01)
*B01J 23/42* (2006.01)
(Continued)

(52) U.S. Cl.
CPC .............. *C08L 83/04* (2013.01); *B01J 23/42* (2013.01); *C08K 3/042* (2017.05); *C08K 7/20* (2013.01);
(Continued)

(58) Field of Classification Search
CPC .......... C08L 83/04; C08L 83/00; C08K 5/56; C08K 3/04
See application file for complete search history.

(56) References Cited

U.S. PATENT DOCUMENTS

| | | |
|---|---|---|
| 4,555,284 A | 11/1985 | Quella |
| 4,608,395 A | 8/1986 | Hamada |

(Continued)

FOREIGN PATENT DOCUMENTS

| | | |
|---|---|---|
| CN | 105778516 | 7/2016 |
| CN | 106633915 | 5/2017 |

(Continued)

OTHER PUBLICATIONS

Loctite Worldwide Design Handbook 1996/97 Edition, Disclosure (Jun. 29, 2018), 1-85.
(Continued)

*Primary Examiner* — Eli D. Strah
(74) *Attorney, Agent, or Firm* — Philip P. Soo

(57) ABSTRACT

Disclosed is a curable composition and cured products thereof. The curable composition includes a vinyl polysiloxane component, a hydrogen polysiloxane component, a polymerization catalyst, and an expandable graphite component comprising moisture. Cured products of the curable composition include foamed cells having a uniform size and distribution in the cured product. This can help to increase the water proofing and flame retardant properties of the cured product.

12 Claims, 2 Drawing Sheets

(51) Int. Cl.
*C08K 3/04* (2006.01)
*C08K 7/20* (2006.01)

(52) U.S. Cl.
CPC ....... *C08L 2203/14* (2013.01); *C08L 2205/18* (2013.01)

(56) References Cited

U.S. PATENT DOCUMENTS

| | | | |
|---|---|---|---|
| 5,614,563 A | 3/1997 | Ishida | |
| 6,022,904 A | 2/2000 | Sollradl | |
| 7,635,728 B2 | 12/2009 | Diakoumakos | |
| 7,786,205 B2 | 8/2010 | Mehan | |
| 7,858,197 B2 | 12/2010 | Ahn | |
| 8,658,755 B2 | 2/2014 | Saito | |
| 9,340,655 B2 | 5/2016 | Shimakawa | |
| 10,822,743 B2 | 11/2020 | Jia | |
| 2010/0305226 A1* | 12/2010 | Cremer | C08J 9/0066 521/99 |
| 2013/0045358 A1 | 2/2013 | Swindells | |
| 2013/0310780 A1 | 11/2013 | Phillips | |
| 2018/0223069 A1 | 8/2018 | O'Neil | |
| 2018/0223070 A1* | 8/2018 | O'Neil | H01M 50/24 |
| 2023/0092698 A1* | 3/2023 | Chen | C08K 9/02 429/185 |

FOREIGN PATENT DOCUMENTS

| | | |
|---|---|---|
| CN | 105778511 | 11/2018 |
| JP | H08-059868 | 3/1996 |
| JP | 2009-256451 | 11/2009 |
| JP | 2009256451 A * | 11/2009 |
| WO | WO 2001-028771 | 4/2001 |
| WO | WO-2017082958 A1 * | 5/2017 ............. B29C 44/08 |
| WO | WO 2018/018483 | 2/2018 |
| WO | WO 2018-067443 | 4/2018 |

OTHER PUBLICATIONS

International Search Report for PCT International Application No. PCT/CN2018/100644, mailed on Apr. 28, 2019, 6 pages.
"Building Functional Materials", edited by Ma Yiping, Tongji University Press, 1st edition, p. 256, Mar. 2014).
"Effect of Moisture on Expansion Volume of Expandable Graphite", Li Zhe et al., Nonmetallic Minerals, vol. 38, No. 3, pp. 19-20, 58, published on May 31, 2015.

* cited by examiner

SILICONE SEALER COMPOSITIONS

CROSS REFERENCE TO RELATED APPLICATIONS

This is a national stage filing under 35 U.S.C. 371 of PCT/CN2018/100644, filed 15 Aug. 2018, the disclosure of which is incorporated by reference in its entirety herein.

BACKGROUND

Cured products for use as sealers and gaskets in assemblies need to be able to effectively seal a junction between two substrates. In addition to sealing the junction, it can be desirable for the sealer to have additional properties such as water proofing properties or flame retardant properties. However, simply adding components to impart water proofing properties or flame retardant properties to a curable composition can result in a cured product that is deficient in providing either property or in providing a proper seal. There is therefore a need to develop curable compositions and cured products that provide an effective seal and provide water proofing properties and flame retardant properties.

SUMMARY OF THE DISCLOSURE

The present disclosure provides a curable silicone composition. The composition includes a vinyl polysiloxane component, a hydrogen polysiloxane component, a polymerization catalyst, and an expandable graphite component comprising moisture.

The present disclosure further provides a curable silicone composition. The composition includes a first part. The first part includes a vinyl polysiloxane component and a polymerization catalyst. The composition further includes a second part. The second part includes a hydrogen polysiloxane component. In various embodiments the second part can include a vinyl polysiloxane component, which can facilitate the mixing of the first part and the second part. The first part, the second part, or both can additionally include an expandable graphite component including moisture.

The present disclosure further provides a curable silicone composition. The composition includes a vinyl polysiloxane component having a structure according to Formula I:

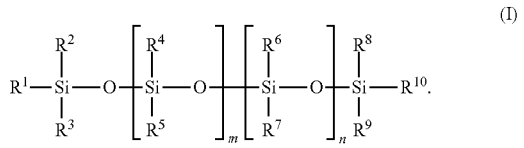

(I)

In Formula I, $R^1$, $R^2$, $R^3$, $R^4$, $R^5$, $R^6$, $R^7$, $R^8$, $R^9$, and $R^{10}$, are independently chosen from —H, —OH, and substituted or unsubstituted $(C_1\text{-}C_{20})$hydrocarbyl; at least one of $R^1$, $R^4$, $R^5$, and $R^{10}$, comprises a vinyl group; m is any positive integer; n is zero or any positive integer; and m and n are in random or block orientation. The curable silicon composition further includes a hydrogen polysiloxane component having a structure according to Formula VI:

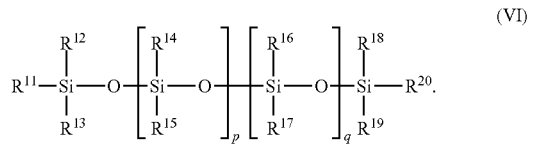

(VI)

In Formula VI, $R^{11}$, $R^{12}$, $R^{13}$, $R^{14}$, $R^{15}$, $R^{16}$, $R^{17}$, $R^{18}$, $R^{19}$, and $R^{20}$ are independently chosen from —H, —OH, substituted or unsubstituted $(C_1\text{-}C_{20})$hydrocarbyl and at least one of $R^{11}$, $R^{14}$, $R^{15}$, and $R^{20}$, is —H; p is any positive integer; q is zero or any positive integer; and p and q are in random or block orientation. The curable composition further includes a polymerization catalyst comprising platinum; an expandable graphite component comprising a plurality of graphite flakes; and a polymer microsphere component.

The present disclosure further provides a cured product of a curable composition. The curable composition includes a vinyl polysiloxane component, a hydrogen polysiloxane component, a polymerization catalyst, and an expandable graphite component comprising moisture.

The present disclosure further provides an assembly. The assembly includes a first substrate and a second substrate. The assembly further includes a cured product of a curable composition. The curable composition includes a vinyl polysiloxane component, a hydrogen polysiloxane component, a polymerization catalyst, and an expandable graphite component comprising moisture. The cured product is in contact with the first substrate and the second substrate.

The present disclosure further provides a method of making the assembly. The method includes contacting a curable composition, including a vinyl polysiloxane component, a hydrogen polysiloxane component, a polymerization catalyst, and an expandable graphite component comprising moisture, with one of a first substrate and a second substrate. The curable composition is cured thereon.

The present disclosure further provides a vehicle. The vehicle includes an assembly including a first substrate and a second substrate. The assembly further includes a cured product of a curable composition. The curable composition includes a vinyl polysiloxane component, a hydrogen polysiloxane component, a polymerization catalyst, and an expandable graphite component comprising moisture. The cured product is in contact with the first substrate and the second substrate.

The present disclosure further provides a method of making a curable silicone composition. The method includes providing or receiving a two-part precursor composition. A first part includes a vinyl polysiloxane component, and a polymerization catalyst. A second part includes a hydrogen polysiloxane component. The second part can further include a vinyl polysiloxane component. The first part, the second part, or both comprise an expandable graphite component comprising moisture. The first part and the second part are combined to form a mixture.

The present disclosure further provides a system for performing the method of making the curable silicon composition. The system can include a first holding chamber and a second holding chamber.

There are various advantages associated with the curable compositions, cured products, systems, assemblies, and methods disclosed herein, some of which are unexpected. For example, according to various embodiments cured products of the instant curable compositions can have a distribution of closed or open foamed cells having a uniform size and distribution. According to various embodiments, the uniformity of foamed cells can help to ensure that each surface of the cured product are substantially smooth. According to various embodiments, smooth surfaces can help to create a tight seal between two substrates. This can help to improve the cured product's performance as a substantially water proof seal. According to various embodiments, the cured product can have a compression set ratio that is low enough to allow the cured product to serve as an effective sealer or gasket. According to various embodiments, the sealer or gasket can continue to be effective after undergoing multiple compression and decompression cycles which can allow for an assembly including to be serviced if servicing includes separating components in contact with the sealer or gasket. According to various embodiments, the cured product is substantially water proof and flame retardant properties.

BRIEF DESCRIPTION OF THE FIGURES

The drawings illustrate generally, by way of example, but not by way of limitation, various embodiments discussed in the present document.

DETAILED DESCRIPTION

Figure 1:
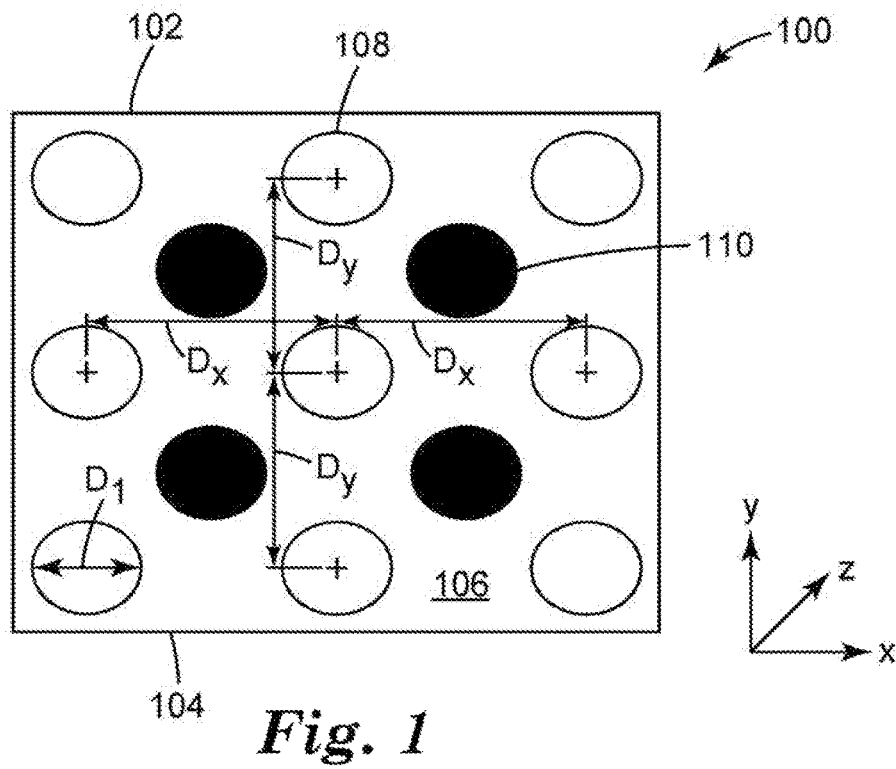
FIG. 1. is a schematic sectional view of a cured product.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

The term "organic group" as used herein refers to any carbon-containing functional group. Examples can include an oxygen-containing group such as an alkoxy group, aryloxy group, aralkyloxy group, oxo(carbonyl) group; a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, C(=NOR)R, and substituted or unsubstituted (C$_1$-C$_{100}$)hydrocarbyl, wherein R can be hydrogen (in examples that include other carbon atoms) or a carbon-based moiety, and wherein the carbon-based moiety can be substituted or unsubstituted.

The term "substituted" as used herein in conjunction with a molecule or an organic group as defined herein refers to the state in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, and C(=NOR)R, wherein R can be hydrogen or a carbon-based moiety; for example, R can be hydrogen, (C$_1$-C$_{100}$)hydrocarbyl, alkyl, acyl, cycloalkyl, aryl, aralkyl, heterocyclyl, heteroaryl, or heteroarylalkyl; or wherein two R groups bonded to a nitrogen atom or to adjacent nitrogen atoms can together with the nitrogen atom or atoms form a heterocyclyl.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbon atoms or, in some embodiments, from 2 to 8 carbon atoms. Examples include, but are not limited to vinyl, —CH═CH(CH$_3$), —CH═C(CH$_3$)$_2$, —C(CH$_3$)═CH$_2$, —C(CH$_3$)═CH(CH$_3$), —C(CH$_2$CH$_3$)═CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is bonded to a hydrogen forming a "formyl" group or is bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. An acyl group can include 0 to about 12, 0 to about 20, or 0 to about 40 additional carbon atoms bonded to the carbonyl group. An acyl group can include double or triple bonds within the meaning herein. An acryloyl group is an example of an acyl group. An acyl group can also include heteroatoms within the meaning herein. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or trisubstituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbon groups that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, a phenyl group substituted at any one or more of 2-, 3-, 4-, 5-, or 6-positions of the phenyl ring, or a naphthyl group substituted at any one or more of 2- to 8-positions thereof.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" or "hydrocarbyl" as used herein refers to a molecule or functional group that includes carbon and hydrogen atoms. The term can also refer to a molecule or functional group that normally includes both carbon and hydrogen atoms but wherein all the hydrogen atoms are substituted with other functional groups.

The term "room temperature" as used herein refers to a temperature of about 15° C. to 40° C.

The polymers described herein can terminate in any suitable way. In some embodiments, the polymers can terminate with an end group that is independently chosen from a suitable polymerization initiator, —H, —OH, a substituted or unsubstituted (C$_1$-C$_{20}$)hydrocarbyl (e.g., (C$_1$-C$_{10}$)alkyl or (C$_6$-C$_{20}$)aryl) interrupted with 0, 1, 2, or 3 groups independently selected from —O—, substituted or unsubstituted —NH—, and —S—, a poly(substituted or unsubstituted (C$_1$-C$_{20}$)hydrocarbyloxy), and a poly(substituted or unsubstituted (C$_1$-C$_{20}$)hydrocarbylamino).

According to various embodiments of the present disclosure, a curable self-foaming and fire retardant silicone composition ("curable composition' or "curable silicone composition") can include various components, combinations thereof, and sub-combinations thereof. Examples of suitable components can include a vinyl polysiloxane component; a hydrogen polysiloxane component; a polymerization catalyst; an expandable graphite component comprising moisture; a microsphere component; a reaction retardant component; a particulate filler component; an alcohol component; and water.

The vinyl polysiloxane component can be present in the curable composition in any suitable weight percentage (wt %). For example, the vinyl polysiloxane can be present in a range of from about 20 wt % to about 90 wt % of the curable composition, about 29 wt % to about 80 wt %, about 34 wt % to about 46 wt %, or less than, equal to, or greater than about 20 wt %, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or about 90 wt %. The vinyl polysiloxane component can include one or more vinyl polysiloxanes. In some embodiments, the polysiloxanes will be identical by way of structure, molecular weight, mole percent of repeating units, or vinyl content. In other embodiments, the vinyl polysiloxane component can include a blend of vinyl polysiloxanes that differ by way of structure, molecular weight, mole percent of repeating units, or vinyl content. In some embodiments the vinyl polysiloxane component comprises one or more vinyl polysiloxane homopolymers, vinyl polysiloxane copolymers, or combinations thereof.

A suitable example of a vinyl polysiloxane is a polysiloxane having a structure according to Formula I:

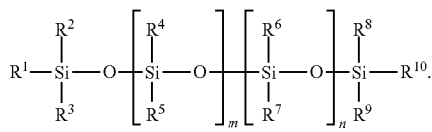
(I)

In Formula I, $R^1$, $R^2$, $R^3$, $R^4$, $R^5$, $R^6$, $R^7$, $R^8$, $R^9$, and $R^{10}$, are independently chosen from —H, —OH, and substituted or unsubstituted $(C_1$-$C_{20})$hydrocarbyl. At least one of $R^1$, $R^4$, $R^5$, and $R^{10}$, comprises a vinyl group. Additionally, m and n are in random or block orientation. The units m and n can represent the number of each repeating unit in the polysiloxane. Alternatively, the units m and n can represent the mol % of each repeating unit in the polysiloxane. The unit m can be any positive integer and the unit n can be any positive integer or zero.

In further embodiments, $R^1$, $R^2$, $R^3$, $R^4$, $R^5$, $R^6$, $R^7$, $R^8$, $R^9$, and $R^{10}$ of the polysiloxane according to Formula I, can be independently chosen from —H, —OH, substituted or unsubstituted $(C_1$-$C_{20})$alkyl, $(C_1$-$C_{20})$alkenyl, $(C_1$-$C_{20})$alkynyl, $(C_1$-$C_{20})$acyl, $(C_1$-$C_{20})$cycloalkyl, $(C_1$-$C_{20})$aryl, $(C_1$-$C_{20})$alkoxyl, and $(C_1$-$C_{20})$haloalkyl. In further embodiments, the vinyl polysiloxane component can include one or more vinyl polysiloxanes independently having a structure according to at least one of Formula II and Formula III:

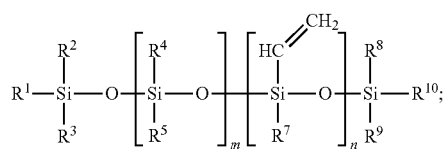
(II)

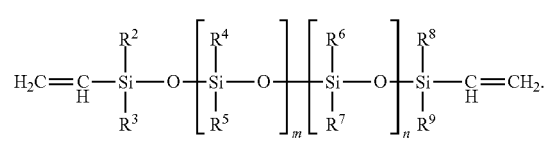
(III)

In still further embodiments, the vinyl polysiloxane component includes a vinyl polysiloxane having the structure according to Formula IV:

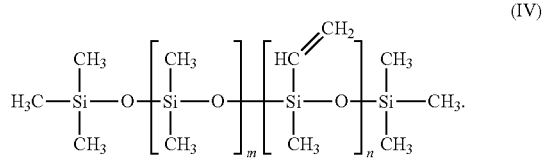
(IV)

In still further embodiments, the vinyl polysiloxane component includes a vinyl polysiloxane having the structure according to Formula V:

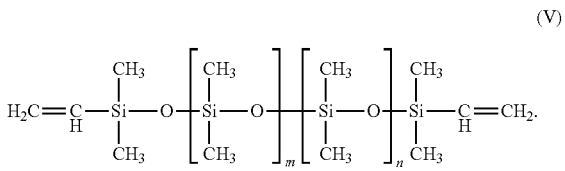
(V)

A vinyl content of the one of more vinyl polysiloxanes can be in a range of from about 0.0010 mmol/g to about 5 mmol/g, about 0.005 mmol/g to about 0.1 mmol/g, or less than, equal to, or greater than about 0.0010 mmol/g, 0.0020, 0.0030, 0.0040, 0.0050, 0.0060, 0.0070, 0.0080, 0.0090, 0.0100, 0.0200, 0.0300, 0.0400, 0.0500, 0.0600, 0.0700, 0.0800, 0.0900, 0.1000, 0.2000, 0.3000, 0.4000, 0.5000, 0.6000, 0.7000, 0.8000, 0.9000, 1, 1.5, 2, 2.5, 3, 3.5, 4, 4.5, or about 5 mmol/g. The vinyl content of the one or more vinyl polysiloxanes can affect the degree to which the vinyl polysiloxanes cross-link (either with other vinyl polysiloxanes or hydrogen polysiloxanes).

A viscosity of the one or more vinyl polysiloxanes can independently be in a range of from about 100 mPa-s to about 500,000 mPa-s at 25° C., about 200 mPa-s to about 300,000 mPa-s, or less than, equal to, or greater than about 100 mPa-s, 150 mPa-s, 200 mPa-s, 250 mPa-s, 300 mPa-s, 350 mPa-s, 400 mPa-s, 450 mPa-s, 500 mPa-s, 250,000 mPa-s, 300,000 mPa-s, 400,000 mPa-s, 500,000 mPa-s at 25° C. As discussed further herein, the viscosity of the vinyl polysiloxane can affect the uniformity of the closed or open foamed cells formed in a resulting cured composition.

The hydrogen polysiloxane component can be in a range of from about 0.5 wt % to about 30 wt % of the second part, about 5 wt % to about 20 wt %, or less than, equal to, or greater than about 0.5 wt %, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, or about 30 wt %.

The hydrogen polysiloxane component can include one or more hydrogen polysiloxanes. In some embodiments, the polysiloxanes will be identical by way of structure, molecular weight, mole percent of repeating units, or hydrogen content. In other embodiments, the hydrogen polysiloxane component can include a blend of hydrogen polysiloxanes that differ by way of structure, molecular weight, mole percent of repeating units, or hydrogen content. In some embodiments the hydrogen polysiloxane component comprises one or more hydrogen polysiloxane homopolymers, hydrogen polysiloxane copolymers, or combinations thereof. The hydrogen polysiloxane forms part of a cross-linked network in a cured product and can also react with any —OH groups to form hydrogen gas which can foam the cured product.

A suitable example of a hydrogen polysiloxane is a polysiloxane having a structure according to Formula VI:

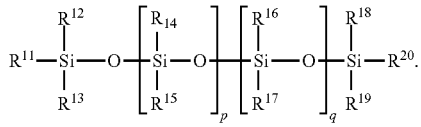

In Formula VI, $R^{11}$, $R^{12}$, $R^{13}$, $R^{14}$, $R^{15}$, $R^{16}$, $R^{17}$, $R^{18}$, $R^{19}$, and $R^{20}$ are independently chosen from —H, —OH, substituted or unsubstituted $(C_1$-$C_{20})$hydrocarbyl and at least one of $R^{11}$, $R^{14}$, $R^{15}$, and $R^{20}$, is —H. Additionally, p and q are in random or block orientation. The units p and q can represent the number of each repeating unit in the polysiloxane. Alternatively, the units p and q can represent the mol % of each repeating unit in the polysiloxane. The unit p can be any positive integer and the unit q can be any positive integer or zero.

In further embodiments, $R^{11}$, $R^{12}$, $R^{13}$, $R^{14}$, $R^{15}$, $R^{16}$, $R^{17}$, $R^{18}$, $R^{19}$, and $R^{20}$ of the polysiloxane according to Formula VI are independently chosen from —H, —OH, substituted or unsubstituted $(C_1$-$C_{20})$alkyl, $(C_1$-$C_{20})$alkenyl, $(C_1$-$C_{20})$alkynyl, $(C_1$-$C_{20})$acyl, $(C_1$-$C_{20})$cycloalkyl, $(C_1$-$C_{20})$aryl, $(C_1$-$C_{20})$alkoxyl, and $(C_1$-$C_{20})$haloalkyl. In further embodiments, the hydrogen polysiloxane component can include one or more hydrogen polysiloxanes independently having a structure according to at least one of Formula VII and Formula VIII:

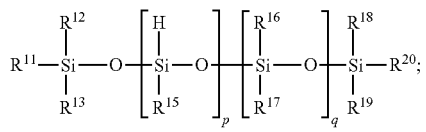

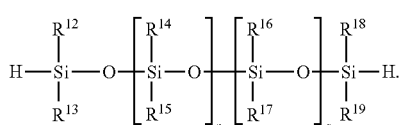

In still further embodiments, the hydrogen polysiloxane component includes a hydrogen polysiloxane having a structure according to Formula IX:

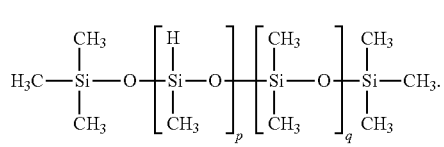

In still further embodiments, the hydrogen polysiloxane component includes a hydrogen polysiloxane having a structure according to Formula X:

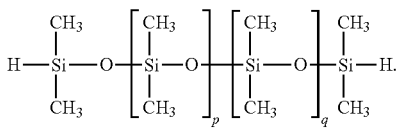

A hydrogen content of the one of more hydrogen polysiloxanes can be in a range of from about 0.0010 mmol/g to about 5 mmol/g, about 0.005 mmol/g to about 0.1 mmol/g, or less than, equal to, or greater than about 0.0010 mmol/g, 0.0020, 0.0030, 0.0040, 0.0050, 0.0060, 0.0070, 0.0080, 0.0090, 0.0100, 0.0200, 0.0300, 0.0400, 0.0500, 0.0600, 0.0700, 0.0800, 0.0900, 0.1000, 0.2000, 0.3000, 0.4000, 0.5000, 0.6000, 0.7000, 0.8000, 0.9000, 1, 1.5, 2, 2.5, 3, 3.5, 4, 4.5, or about 5 mmol/g.

The polymerization catalyst can function to catalyze the formation of a network of during curing. Examples of suitable polymerization catalysts include platinum containing catalysts. In examples where the polymerization catalyst includes platinum complex, polymerization catalyst can be in a range of from about 1 ppm to about 1000 ppm of the curable composition based on the platinum amount, about 10 ppm to about 250 ppm, or less than, equal to, or greater than about 1 ppm, 10, 15, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or about 1000 ppm. Examples of suitable platinum containing catalysts include bis(acetylacetonato)platinum(ii), cis-diamminedichloroplatinum(ii), di-μ-chloro-bis[chloro(cyclohexene)platinum(ii)], cis-dichlorobis(triphenylphosphane)platinum(ii), dichloro(cycloocta-1.5-diene)platinum(ii), dihydrogen hexachloroplatinate(iv) hydrate, dihydrogen hexachloroplatinate(iv), platinum(0) divinyltetramethylsiloxane complex, tetrakis(triphenylphosphane)platinum(0), dihydrogen hexachloroplatinate(iv) solution, or mixtures thereof.

The expandable graphite component can be present in in a range of from about 0.05 wt % to about 30 wt % of the curable composition, about 2 wt % to about 20 wt % of the curable composition, about 5 wt % to about 15 wt %, about 2 wt % to about 15 wt % or less than, equal to, or greater than about, 0.05 wt %, 0.5, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, or about 30.5. The expandable graphite component can include a plurality of flakes and can act as a flame retardant in the resulting cured product. The plurality of graphite flakes can have a mesh size independently in a range of from about 20 to about 350, about 50 to about 200, or less than, equal to, or greater than about 20, 30, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, or about 350.

The graphite flakes can include moisture (e.g., water) that is pre-absorbed or preblended thereon. As described further herein having graphite flakes that include moisture, surprisingly, can help to create substantially uniform sized foamed cells in the cured composition when foam is formed from the hydrogen gas resulting from the reaction of the hydrogen polysiloxane and moisture from graphite and additionally with any water or alcohol added to the reaction. Individual graphite flakes can include moisture in a range of from about 0.05 wt % to about 5 wt %, about 0.1 wt % to about 2 wt %, or less than, equal to, or greater than about 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or about 5 wt % per flake. Additional water can be added to the curable composition to augment the moisture provided by the graphite flakes.

The curable composition can further include a microsphere component to reduce the foam density and help the foaming process. The microsphere component can include a plurality to microspheres. The microsphere component can be in a range of from about 0.05 wt % to about 10 wt % of the curable composition, about 0.30 wt % to about 2 wt %, or less than, equal to, or greater than about 0.05 wt %, 0.10, 0.15, 0.20, 0.25, 0.30, 0.35, 0.40, 0.45, 0.50, 0.55, 0.60, 0.65, 0.70, 0.75, 0.80, 0.85, 0.90, 0.95, 1, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4, 4.05, 4.10, 4.15, 4.20, 4.25, 4.30, 4.35, 4.40, 4.45, 4.50, 4.55, 4.60, 4.65, 4.70, 4.75, 4.80, 4.85, 4.90, 4.95, 5, 5.05, 5.10, 5.15, 5.20, 5.25, 5.30, 5.35, 5.40, 5.45, 5.50, 5.55, 5.60, 5.65, 5.70, 5.75, 5.80, 5.85, 5.90, 5.95, 6, 6.05, 6.10, 6.15, 6.20, 6.25, 6.30, 6.35, 6.40, 6.45, 6.50, 6.55, 6.60, 6.65, 6.70, 6.75, 6.80, 6.85, 6.90, 6.95, 7, 7.05, 7.10, 7.15, 7.20, 7.25, 7.30, 7.35, 7.40, 7.45, 7.50, 7.55, 7.60, 7.65, 7.70, 7.75, 7.80, 7.85, 7.90, 7.95, 8, 8.05, 8.10, 8.15, 8.20, 8.25, 8.30, 8.35, 8.40, 8.45, 8.50, 8.55, 8.60, 8.65, 8.70, 8.75, 8.80, 8.85, 8.90, 8.95, 9, 9.05, 9.10, 9.15, 9.20, 9.25, 9.30, 9.35, 9.40, 9.45, 9.50, 9.55, 9.60, 9.65, 9.70, 9.75, 9.80, 9.85, 9.90, 9.95, or about 10 wt %.

The microspheres can include a plurality of microspheres that are chosen from polymer microspheres, glass microspheres, ceramic microspheres, or combinations thereof. Suitable polymer microspheres may include pre-expanded or unexpanded microspheres. Unexpanded organic hollow microsphere fillers are available, for example, from Akzo Nobel under the trade designation EXPANCEL. The Expancel microspheres include a polymer shell encapsulating an essentially liquid gas such as, for example, liquid isobutane. The unexpanded microspheres expand when the temperature is raised to effect curing so that the composition expands and foams during curing. The Expancel type unexpanded microspheres are available in different qualities which are characterized by different onset temperatures for expansion which can be selected depending on the curing temperature of the precursor. The onset temperature can be in a range of from about 80° C. to 130° C.

Unexpanded microspheres are sometimes also referred to as expandable organic microballoons which are also available, for example, from Lehmann and Voss, Hamburg, Germany under the trade designation MICROPEARL.

Pre-expanded organic hollow microspheres are commercially available, for example, from Lehmann & Voss, Hamburg, Germany under the trade designation DUALITE. The pre-expanded organic microspheres may include a polymer shell comprising, for example, an acrylonitrile/acrylate copolymer, a vinylidenechloride/acrylonitrile copolymer, or a mixture thereof. The shell encapsulates a core including, for example, one or more essentially gaseous hydrocarbons. It is possible for some microspheres to have an inorganic filler coated on an exterior surface of the microsphere.

A median diameter size of about 50% of foamed cells 108 ($D_{50}$) of an individual microsphere of the plurality of microspheres can be in a range of from about 1 μm to about 500 μm, about 20 μm to about 250 μm, or less than, equal to, or greater than about 1 μm, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, or about 500 μm.

In order to control the rate of polymerization of the curable composition, the composition may include a reaction retardant component or inhibitor. The reaction retardant can be in a range of from about 0.01 wt % to about 5 wt % of the curable composition, about 0.05 wt % to about 2 wt %, or less than equal to, or greater than about 0.01 wt %, 0.05, 0.1, 0.15, 0.2, 0.25, 0.3, 0.35, 0.4, 0.45, 0.5, 0.55, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.65, 2.7, 2.75, 2.8, 2.85, 2.9, 2.95, 3, 3.05, 3.1, 3.15, 3.2, 3.25, 3.3, 3.35, 3.4, 3.45, 3.5, 3.55, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.55, 4.65, 4.7, 4.75, 4.8, 4.85, 4.9, 4.95, or about 5 wt %.

The reaction retardant can be chosen from many suitable compounds that are capable of controlling the rate of polymerization. Examples of suitable reaction retardants include 1,3,5,7-tetramethyl-1,3,5,7-tetravinyl-cyclotetrasiloxane, 1,3-divinyl tetramethyl disiloxane, 2-methyl-3-butyn-2-ol, 2-phenyl-3-butyn-2-ol, 3,5-dimethyl-1-hexyn-3-ol, 1-ethynyl-1-cyclohexanol, 1,5-hexadiene, 1,6-heptadiene; 3,5-dimethyl-1-hexen-lyne, 3-ethyl-3-buten-1-yne, 3-phenyl-3-buten-1-yne; 1,3-divinyltetramethyldisiloxane, 1,3,5,7-tetravinyltetramethyl cyclotetrasiloxane, 1,3-divinyl-1,3-diphenyldimethyldisiloxane, methyltris (3-methyl-1-butyn-3-oxy) silane, or a mixture thereof.

The curable composition can also include a filler component. The filler component can serve many suitable functions. For example, the filler component can be used increase flame retardancy, add strength (e.g., tensile strength or % elongation at break), increase viscosity of the curable composition, reduce manufacturing costs, or adjust density in a cured product formed from the curable composition. The filler component can be present in the curable composition in a range of from about 2 wt % to about 30 wt % of the curable composition, about 5 wt % to about 15 wt %, or less than, equal to, or greater than about 2 wt %, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, or about 30 wt %.

Examples of suitable fillers of the filler component may include fibrous or particulate fillers. The filler can be glass fibers, aluminum silicate (mullite), synthetic calcium silicate, zirconium silicate, fused silica, crystalline silica graphite, natural silica sand, or the like; boron powders such as boron-nitride powder, boron-silicate powders, or the like;

oxides such as TiO$_2$, aluminum oxide, magnesium oxide, zinc oxide, or the like; calcium sulfate (as its anhydride, dehydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin; single crystal fibers or "whiskers" such as silicon carbide, alumina, boron carbide, iron, nickel, copper, or the like; fibers (including continuous and chopped fibers) such as asbestos, carbon fibers; sulfides such as molybdenum sulfide, zinc sulfide, or the like; barium compounds such as barium titanate, barium ferrite, barium sulfate, heavy spar, or the like; metals (e.g., metal mesh, metal plate) and metal oxides such as particulate or fibrous aluminum, bronze, zinc, copper and nickel, or the like; flaked fillers such as glass flakes, flaked silicon carbide, aluminum diboride, aluminum flakes, steel flakes or the like; fibrous fillers, for example, short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as kenaf, cellulose, cotton, sisal, jute, flax, starch, corn flour, lignin, ramie, rattan, agave, bamboo, hemp, ground nut shells, corn, coconut (coir), rice grain husks or the like; organic fillers such as polytetrafluoroethylene, reinforcing organic fibrous fillers formed from organic polymers capable of forming fibers such as poly(ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as fillers such as mica, clay, feldspar, flue dust, fillite, quartz, quartzite, perlite, Tripoli, diatomaceous earth, carbon black, or the like, or combinations including at least one of the foregoing fillers. The filler can surface treated with silanes, siloxanes, or a combination of silanes and siloxanes to improved adhesion and dispersion. The filler can be a silica filler. The silica filler can be any suitable silica filler, such that the sealant composition can be used as described herein. The silica filler can be fumed silica.

The curable composition can also include additional water. The water can be present in a range of from about 0.01 wt % to about 5 wt % of the curable composition, about 0.01 wt % to about 1 wt %, or less than, equal to, or greater than about 0.01 wt %, 0.05, 0.1, 0.15, 0.2, 0.25, 0.3, 0.35, 0.4, 0.45, 0.5, 0.55, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.65, 2.7, 2.75, 2.8, 2.85, 2.9, 2.95, 3, 3.05, 3.1, 3.15, 3.2, 3.25, 3.3, 3.35, 3.4, 3.45, 3.5, 3.55, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.55, 4.65, 4.7, 4.75, 4.8, 4.85, 4.9, 4.95, or about 5 wt %.

The curable composition can also include an alcohol component. The alcohol component can be present in a range of from about 0.01 wt % to about 5 wt % of the curable composition, about 0.01 wt % to about 1 wt %, or less than, equal to, or greater than about 0.01 wt %, 0.05, 0.1, 0.15, 0.2, 0.25, 0.3, 0.35, 0.4, 0.45, 0.5, 0.55, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.65, 2.7, 2.75, 2.8, 2.85, 2.9, 2.95, 3, 3.05, 3.1, 3.15, 3.2, 3.25, 3.3, 3.35, 3.4, 3.45, 3.5, 3.55, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.55, 4.65, 4.7, 4.75, 4.8, 4.85, 4.9, 4.95, or about 5 wt %.

The alcohol component can include any suitable alcohol. For example, the alcohol component can include a monofunctional alcohol, a polyfunctional alcohol, or a mixture thereof. Examples of suitable alcohols can include propanol, glycol, or a mixture thereof. Where present, the alcohol can be used to help create uniform foamed cells in the cured product or serve as cross-linkers for the polysiloxanes. In some embodiments, adding the alcohol component and water can allow for increasing the level of foaming in a cured product by allowing for a reaction between the water, alcohol component, and hydrogen polysiloxane component to create hydrogen gas.

The curable composition can be formed according to many suitable methods. As an example of a suitable method, the curable composition can be formed from the combination of at least two mixtures. In embodiments where the composition is formed from a two-part mixture a first part can include the vinyl polysiloxane component, the polymerization catalyst, the expandable graphite component, the reaction retardant component, the particulate filler component, the alcohol component, water, or any combination or sub-combination thereof. A second part can include the vinyl polysiloxane component, the hydrogen polysiloxane component, the expandable graphite component, the particulate filler component, the alcohol component, water, or any combination thereof or any sub-combination thereof.

The vinyl polysiloxane component can independently be in a range of from about 20 wt % to about 85 wt % of the first part and the second part, about 50 wt % to about 80 wt %, or less than, equal to, or greater than about 20 wt %, 25, 30, 35, 40, 45, 50, 55, 60, 65, 70, 75, 80, or 85 wt %.

The expandable graphite component can independently be in a range of from about 0 wt % to about 20 wt % of the first part or the second part, about, 0.05 wt % to about 10 wt % of the first part or the second part, or less than, equal to, or greater than about 0.05 wt %, 0.5, 1, 1.5, 2, 2.5, 3, 3.5, 4, 4.5, 5, 5.5, 6, 6.5, 7, 7.5, 8, 8.5, 9, 9.5, or about 10 wt %

The particulate filler component can independently be in a range of from about 0 wt % to about 30 wt % of the first part or the second part, about 5 wt % to about 20 wt %, or less than, equal to, or greater than about 0 wt %, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, or about 30 wt %.

The alcohol component can independently be in a range of from about 0 wt % to about 10 wt % of the first part or the second part, about 0.2 wt % to about 5 wt %, or less than, equal to, or greater than 0 wt %, 0.5, 1.5, 2, 2.5, 3, 3.5, 4, 4.5, 5, 5.5, 6, 6.5, 7, 7.5, 8, 8.5, 9, 9.5, or about 10 wt %.

The polymerization catalyst can be present in a range of from about 3 ppm to about 500 ppm of the first part, about 5 ppm to about 200 ppm, or less than, equal to, or greater than about 3 ppm, 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, or about 500 ppm.

The reaction retardant can be in a range of from about 0.05 wt % to about 5 wt % of the first part, about 0.1 wt % to about 2 wt % of the first part, or less than, equal to, or greater than about 0.05, 0.1, 0.15, 0.2, 0.25, 0.3, 0.35, 0.4, 0.45, 0.5, 0.55, 0.65, 0.7, 0.75, 0.8, 0.85, 0.9, 0.95, 1, 1.05, 1.1, 1.15, 1.2, 1.25, 1.3, 1.35, 1.4, 1.45, 1.5, 1.55, 1.65, 1.7, 1.75, 1.8, 1.85, 1.9, 1.95, 2, 2.05, 2.1, 2.15, 2.2, 2.25, 2.3, 2.35, 2.4, 2.45, 2.5, 2.55, 2.65, 2.7, 2.75, 2.8, 2.85, 2.9, 2.95, 3, 3.05, 3.1, 3.15, 3.2, 3.25, 3.3, 3.35, 3.4, 3.45, 3.5, 3.55, 3.65, 3.7, 3.75, 3.8, 3.85, 3.9, 3.95, 4, 4.05, 4.1, 4.15, 4.2, 4.25, 4.3, 4.35, 4.4, 4.45, 4.5, 4.55, 4.65, 4.7, 4.75, 4.8, 4.85, 4.9, 4.95, or about 5 wt %.

The first part and the second part can be combined at any suitable volume ratio. For example, the first part and the second part can be combined at a volume ratio in a range of from about 5:100 to about 100:1, about 10:100 to about 50:1, or less than, equal to, or greater than about 5:100, 20:100, 30:100, 40:100, 50:100. 60:100, 70:100, 80:100, 90:100, 1:1, 10:1, 20:1, 30:1, 40:1, 50:1, 60:1, 70:1, 80:1, 90:1, or about 100:1.

After the first part and the second part are combined to form a mixture, the mixture can be spun at any suitable speed to facilitate adequate mixing. For example, the mixture can be spun at a low speed by hand. Alternatively, the mixture can be spun at a high speed using a machine. For example, the mixture can be spun at a speed of about 1000 rpm to about 3000 rpm, about 1500 rpm to about 2500 rpm, or less than, equal to, or greater than about 1000 rpm, 1100, 1200, 1300, 1400, 1500, 1600, 1700, 1800, 1900, 2000, 2100, 2200, 2300, 2400, 2500, 2600, 2700, 2800, 2900, or about 3000 rpm.

The first part and the second part can be located in any suitable system or kit for containing, mixing, and dispensing the first part and the second part. The system can be suited for large-scale industrial applications or small-scale applications. Either system can include first and second holding chambers for holding the respective first part and second part. The holding chambers can be sized for any application and formed from plastic, metal, or any other suitable material. A dispenser can be adapted to receive the first part and the second part and dispense a mixture of the first part and the second part on a substrate. The dispenser can function to facilitate mixing of the first part and the second part or a mixing chamber can be disposed upstream of the dispenser and in fluid communication with the first holding chamber, and the second holding chamber. The mixing chamber can be adapted to rotate in order to facilitate mixing or the mixing chamber can include a number of baffles to induce rotation of the first part and the second part.

To facilitate movement of the first part and the second part, the system can include elements such as one or more plunger or one or more pumps. The one or more plungers can be useful for systems that are handheld. In these embodiments, a user can push one or two plungers, between at least a first and a second position, to force the first part and the second part through the system. If there is one plunger, then the first part and the second part can be dispensed at equal volumes or at a predetermined volume ratio.

Pumps can be useful in industrial applications where large volumes or a continuous supply of the first part and the second part are dispensed. These systems can include one or more pumps that are in fluid communication with the first and second holding chambers. The one or more pumps can be located downstream of the first and second holding chambers but upstream of the mixing chamber. In embodiments of the system in which there are two pumps in fluid communication with respective first and second holding chambers, the pumps can be adapted or controlled to pump an equal volume of the first part and the second part or to pump different quantities of each part according to a predetermined volume ratio.

Following mixing, the curable composition can be dispensed, by hand or through a system, on to a substrate and cured thereon. Curing can be accomplished at room temperature. Although the rate of reaction can be controlled by altering the temperature. For example, the rate of reaction can be slowed by lowering the temperature below room temperature. Additionally, the rate of reaction can be increased by raising the temperature above room temperature. In some embodiments, the composition can be cured at a temperature in a range of from about 0° C. to about 100° C., about 15° C. to about 40° C., about 15° C. to about 30° C. or less than, equal to, or greater than about 0° C., 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41.5, 42, 42.5, 43, 43.5, 44, 44.5, 45, 45.5, 46, 46.5, 47, 47.5, 48, 48.5, 49, 49.5, 50, 50.5, 51.5, 52, 52.5, 53, 53.5, 54, 54.5, 55, 55.5, 56, 56.5, 57, 57.5, 58, 58.5, 59, 59.5, 60, 60.5, 61.5, 62, 62.5, 63, 63.5, 64, 64.5, 65, 65.5, 66, 66.5, 67, 67.5, 68, 68.5, 69, 69.5, 70, 70.5, 71.5, 72, 72.5, 73, 73.5, 74, 74.5, 75, 75.5, 76, 76.5, 77, 77.5, 78, 78.5, 79, 79.5, 80, 80.5, 81.5, 82, 82.5, 83, 83.5, 84, 84.5, 85, 85.5, 86, 86.5, 87, 87.5, 88, 88.5, 89, 89.5, 90, 90.5, 91.5, 92, 92.5, 93, 93.5, 94, 94.5, 95, 95.5, 96, 96.5, 97, 97.5, 98, 98.5, 99, 99.5, or about 100° C. Curing can occur over any suitable amount of time. For example, curing may occur over an amount of time ranging from about 0.5 minutes to about 24 hours, about 0.5 minutes to about 10 hours, or less than, equal to, or greater than about 0.5 minutes, 1 minute, 5 minutes, 10 minutes, 15 minutes, 20 minutes, 25 minutes, 30 minutes, 35 minutes, 40 minutes, 45 minutes, 50 minutes, 55 minutes, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, or about 24 hours.

FIG. 1. is a schematic sectional view of cured product 100. Cured product 100 is formed from curing any of the cured compositions described herein. Cured product 100 includes first surface 102 and second surface 104 spaced relative to each other and filled by layer 106 of the cured product. Cured product 100 further includes a plurality of foamed cells 108 or open cells and expandable graphite flakes 110 dispersed throughout layer 106.

As shown in FIG. 1, foamed cells 108 have a uniform size (e.g., largest diameter Di) and are uniformly distributed throughout layer 106. With respect to the uniform size of foamed cells 108, a $D_5$ can be in a range of from about 1 μm to about 5000 μm, about 20 μm to about 2000 μm, or less than, equal to, or greater than about 1 μm, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245,250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 1000, 1500, 2000, 2500, 3000, 3500, 4000, 4500 or about 5000 μm. In further embodiments, a median diameter size of about 98% of foamed cells 108 ($D_{98}$) can be in a range of from about 1 μm to about 5000 μm, about 20 μm to about 2000 μm, or less than, equal to, or greater than about 1 μm, 5, 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245,250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 1000, 1500, 2000, 2500, 3000, 3500, 4000, 4500 or about 5000 µm.

As further shown in FIG. 1, foamed cells 108 are uniformly dispersed throughout layer 108. For example, a distance in the x-direction ($D_x$), y-direction ($D_y$), z-direction, or any combination thereof between geometric centers of adjacent foamed cell 108 is substantially the same throughout layer 106. The distance in in the x-direction, y-direction, or z-direction can be any suitable distance. For example, the distance can independently be in a range of from about 5 µm to about 5 mm, about 0.2 mm to about 2 mm, or less than, equal to, or greater than about 5 µm, 50, 100, 150, 200, 250, 300, 350, 400, 450, 500, 550, 600, 650, 700, 750, 800, 850, 900, 950, 1000, 1050, 1100, 1150, 1200, 1250, 1300, 1350, 1400, 1450, 1500, 1550, 1600, 1650, 1700, 1750, 1800, 1850, 1900, 1950, or about 2000 µm.

The uniformity in the size of foamed cells 108 and the distance between foamed cells 108 can be a function of the inclusion of expandable graphite 110. This is because the expandable graphite, which includes water, reacts with the hydrogen polysiloxane during curing to foam the cured product. The addition of the microsphere component also helps to create the uniform size of foamed cells 108 and account for the distance therebetween. This is because the inclusion of the microsphere can decrease density in the curable composition. Surprisingly, it was found that formulations free of graphite comprising moisture lead to non-uniform foamed cells 108. This also led to foamed cells that were too big.

Another factor that was surprisingly found to contribute to the uniformity of foamed cells 108 was the viscosity of the curable composition. The viscosity of the curable composition is a function, in part, of the viscosity of the vinyl polysiloxane component. The viscosity can also be a function of the microsphere component and filler amount and type added into the curable composition can modify the overall viscosity of the curable composition. During curing if the viscosity of the curable composition is too low, the bubbles formed will simply escape, thus preventing formation of foamed cells 108. However, if the viscosity is too high, the bubbles formed cannot penetrate through the entire volume of the curable composition. This leads to a non-uniform distribution of foamed cells 108.

The uniformity of foamed cells 108 has many benefits in the resulting cured product 100. For example, according to various embodiments, the uniformity of foamed cells 108 can help to ensure that the each of first surface 102 and second surface 104 are substantially smooth. This is because cured product 100 will be free of non-uniform agglomerations of foamed cells 108 that would lead to protrusions along either of first surface 102 or second surface 104. Smooth surfaces in cured product 100 can help to create a tight seal between two substrates. This can help to improve cured product 100's performance as a substantially water proof seal.

The uniformity of foamed cells 108 can also help to ensure that cured product 100 has a desirable density. The density of cured product can be in a range of from about 0.200 g/cm$^3$ to about 0.800 g/cm$^3$, about 0.300 g/cm$^3$ to about 0.700 g/cm$^3$, or less than, equal to, or greater than about 0.200 g/cm$^3$, 0.250, 0.300, 0.350, 0.400, 0.450, 0.500, 0.550, 0.600, 0.650, 0.700, 0.750, or about 0.800 g/cm$^3$. The density of cured product 100 can result in weight savings, it can also contribute the ability of cured product 100 to act as a water proof product or a flame retardant product. Additionally, the density, in combination with foamed cells 108, can contribute to the compression set ratio of cured product 100.

A compression set ratio measures the ability of a material to return to its original thickness after prolonged compressive stresses at a given temperature. As a material is compressed over time, it loses its ability to return to its original thickness. This loss of resiliency may reduce the capability of an elastomeric gasket, seal or cushioning pad to perform over a long period of time. The resulting permanent set that material may take over time may cause a leak; or in the case of a shock isolation pad, the ability to protect an accidentally dropped unit may be compromised. As is understood, the lower the compression set ratio, the better the material resists permanent deformation. Cured product 100 can have a compression set ratio measured at about 85° C. for 24 hours at compression ratio 50% that is in a range of from about 0% to about 60%, about 0% to about 40%, or less than equal to, or greater than about 0%, 5, 10, 15, 20, 25, 30, 35, 40, 45, 50, 55, or about 60%. As discussed further herein, cured product 100 can be used a sealer, therefore the low compression set ratios of cured product 100 are desirable.

Another desirable property of cured product 100 is that first major surface 102, second major surface 104, or both are substantially free of a tacky feel. This can be desirable in that debris such as dirt or other particulate materials are less likely to stick to cured product and create a gap between cured product 100 and a substrate. Additionally, the lack of a tacky feel can make it easier to disengage cured product 100 and a substrate.

Another desirable property of cured product 100 is that it is substantially flame retardant. This can be due to the inclusion of the expandable graphite component as well as the other components. The flame retardancy of cured product 100 can be determined by at least one of a UL 94 having a V2, V1, and a V0 rating.

Additionally, as mentioned herein cured product 100 is substantially water proof. The water proof characteristics of cured product 100 can be determined by International Protection Marketing standard IP68. The water proof and flame retardant properties of cured product 100 can make cured product 100 well suited to be a sealer or gasket. The ability to foam cured product 100 can allow cured product to be classified as a foamed sealer. The sealer is well suited for use in many different systems or assemblies.

Figure 2A:
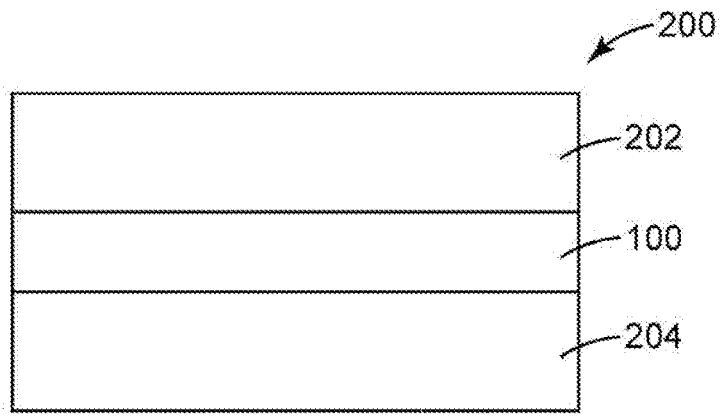
FIG. 2A is a sectional view of an assembly in a resting state.
Figure 2B:
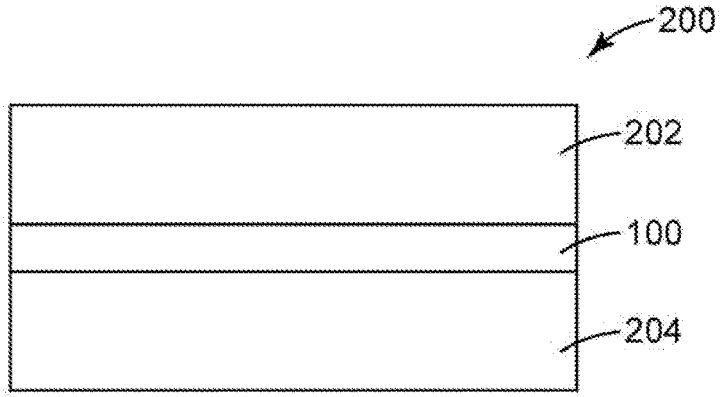
FIG. 2B is a sectional view of the assembly in a compressed state.
Figure 2C:
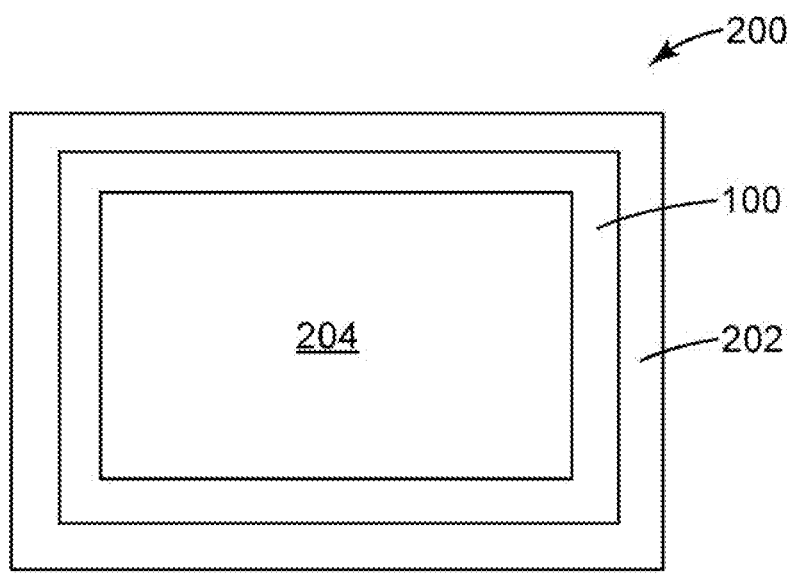
FIG. 2C is a top view of the assembly.

FIG. 2A is a sectional view of assembly 200 in a resting state. FIG. 2B is a sectional view of assembly 200 in a compressed state. FIG. 2C is a top view of assembly 200. FIGS. 2A-2C show many of the same components and are discussed concurrently.

As shown in FIGS. 2A and 2B, assembly 200 includes cured product 100, first substrate 202 and second substrate 204. Cured product 100 is in contact with at least one of first substrate 202 and second substrate 204. As shown, cured product 100 is in continuous contact with first substrate 202 and second substrate 204. That is assembly 200 is free of a gap between the cured product and the first substrate and second substrate. In the resting state cured product 100, is free of compression or is at least less compressed an it is in the compressed state as shown in FIG. 2. As described further herein cured product 100 can be brought to the compressed state by applying pressure to first substrate 202 and second substrate 204 with a clamp, however in some embodiments the weight of either first substrate 202 or second substrate 204 will be enough to compress cured product 100.

Cured product 100 can be adhered to one of first substrate 202 and second substrate 204 while being free of adhesion with the other substrate. The adhesion to one of first substrate 202 and second substrate 204 can be a function of the curable composition being deposited on one of first substrate 202 and second substrate 204 and being cured thereon. This is because the curable composition at least partially adheres to the surface it is cured on. Therefore to avoid adhesion to both first substrate 202 and second substrate 204 the curable composition is not deposited between first substrate 202 and second substrate 204 and then cured.

The ability of cured product 100 to be free of adhesion with one of first substrate 202 and second substrate 204 can allow for the substrates to be removably secured to each other. First substrate 202 and second substrate 204 can be removably secured through a device such as a clamp. The pressure applied causes cured product to compress as shown in FIG. 2B. Compression of cured product 100 can enhance the ability of cured product 100 to effectively create a seal.

First substrate 202 and second substrate 204 can form a box that encloses a void. This is shown in FIG. 2C. FIG. 2C shows first substrate 202 having cured product 100 adhered thereon. Cured product 100 circumscribes void 204. To enclose void 204, second substrate 204 can be placed into contact with cured product 100.

The materials of first substrate 202 and second substrate 204 can also be flame retardant and water proof. The water proof and flame retardant properties of cured product make it particularly well suited for applications in which assembly 200 encloses an electronic component. For example, assembly 200 can be a battery box in which a battery is placed in void 204. The flame-retardant properties of cured product 100 can help to protect a battery or other electronic component from external flames or help prevent spread of flames from the battery or other electronic component in the event of a fire caused by a failure. Additionally, the water proof properties of cured product 100 can help to protect the electronic component from unwanted exposure to moisture.

Assembly 200 can be used in conjunction with many other assemblies or machines. For example, assembly 200 can be a component of a vehicle. Examples of suitable vehicles can include an automobile. The automobile can be an electric automobile. Other vehicles include a train, an aerospace vehicle (e.g., airplane, helicopter, or space craft), or a water craft.

Assembly 200 can be formed according to any suitable method. For example, assembly 200 can be formed by contacting the curable composition with one of first substrate 202 or second substrate 204. Curable composition is cured thereon. To form a cured-in-place compression sealer. The substrate that is free of cured composition 100 is then brought into contact with cured composition 100. To secure first substrate 202 and second substrate 204 pressure can be applied to each substrate to compress cured composition 100. A clam or other suitable device can be used to apply a suitable amount of pressure.

EXAMPLES

Various embodiments of the present disclosure can be better understood by reference to the following Examples which are offered by way of illustration. The present disclosure is not limited to the Examples given herein.

TABLE 1

| Materials | | |
|---|---|---|
| Designation | Description | Source |
| Andisil ® VS 165,000 | Vinyl-terminated dimethylpolysiloxane available under the trade designation Andisil ® VS 165,000 | AB Specialty Silicones of Waukegan, IL. |
| Andisil ® VS 5,000 | Vinyl-terminated dimethylpolysiloxane available under the trade designation Andisil ® VS 5,000 | AB Specialty Silicones of Waukegan, IL. |
| H202 | Hydrogen polysiloxane | Zhejiang Quzhou Jiancheng Silicone Co. Ltd. of Zhejiang Quzhou, China |
| Pt Catalyst 5000ppm | Platinum catalyst | Heraeus of Hanau, Germany |
| Andisil ® 2827-186L | 1,3 Divinyl tetramethyl disiloxane available under the trade designation Andisil ® 2827-186L | AB Specialty Silicones of Waukegan, IL. |
| Andisil ® MVC | Methyl vinyl cyclics available under the trade designation Andisil ® MVC | AB Specialty Silicones of Waukegan, IL. |
| Aerosil ® R 8200 | Hexamehtyldisilazane aftertreated fumed silica available under the trade designation Aerosil ® R 8200 | Evonik Industries AG of Essen, Germany |
| HDK ® H15 | Hydrophobic amorphous silica available under the trade designation HDK ® H15 | Wacker Chemicals Co., Ltd. of Shanghai, China |
| Expancel 920 DET 40 | Low density and moisture absorption polymer microsphere available under the trade designation Expancel 920 DET 40 d30 | AkzoNobel Industrial Chemicals of Taixing, China |

TABLE 1-continued

| Designation | Description | Source |
|---|---|---|
| FN-80SDE | Acrylonitrile copolymer expanded dry powder available under the trade designation FN-80SDE | Matsumoto Yushi-Seiyaku Co., Ltd. of Osaka, Japan |
| MFL-110CAL | Acrylonitrile copolymer expanded dry powder available under the trade MFL-110CAL? | Matsumoto Yushi-Seiyaku Co., Ltd. of Osaka, Japan |
| VORASURFT ™ DC 3042 | Silicone surfactant available under the trade designation VORASURF ™ DC 3042 | DowDuPont of Midland, MI |
| Glycol | Ethylene glycol | Sinpharm Chemical Reagent Co., Ltd. |
| Propanol | 1-Propanol | Sinpharm Chemical Reagent Co., Ltd. |
| ADT1002 | Expandable graphite | Shijiazhuang ADT Carbonic Material Factory of Hebei, China |
| ADT35 | Expandable graphite | Shijiazhuang ADT Carbonic Material Factory of Hebei, China |

Test Methods:

Compression Set: The method of ISO 1856:2000 was followed.

Density: The method ASTM-D-792 was followed using a Mettler Toledo balance density kit.

Tack Free Time: Combined Part A and B mixtures were touched with a finger and the amount of time until the mixture did not feel tacky was recorded.

Waterproof: The IP Code, International Protection Marking, IEC Standard 60529, Edition 2.1. 2001-02 was followed.

Flame Test: FAR 25-853a and FAR 25-853b vertical burner. Reference to UL94-V0 rating with flame height 20 mm, bottom edge of the sample 10 mm into the flame and burn twice at 10 seconds each. A flame propagation height under 125 mm (5 inches) was considered a pass.

Examples 1-18

Part A components (in grams) of the formulations represented in Table 2 were mixed with a SpeedMixer™ DAC 400 FVZ high-speed shear mixer from Flack Tek, Inc. of Landrum, SC. at 1500-2500 rpm for two to five minutes until the components mixed thoroughly. Part B components (in grams) of the formulations represented in Table 2 were mixed with a SpeedMixer™ DAC 400 FVZ high-speed shear mixer from Flack Tek, Inc. of Landrum, SC. at 1500-2500 rpm for two to five minutes until all the components mixed thoroughly. Parts A and B were mixed with a 1:1 volume 2K dispense gun from Nordson EFD of East Providence, RI. and left for 24 hours at room temperature. Examples 1-18 underwent testing and the results are represented in Table 3.

TABLE 2

Part A and B Formulations (in grams)

| | Part | Andisil ® VS 165,000 | Andisil ® VS 5,000 | H202 | Pt Catalyst | Andisil ® 2827-186L | Andisil ® MVC | Aerosil ® R 8200 | HDK ® H15 |
|---|---|---|---|---|---|---|---|---|---|
| Ex 1 | A | 40 | 0 | 0 | 0.6 | 0.7 | 0 | 5.0 | 1.5 |
| | B | 40 | 0 | 4.0 | 0 | 0 | 0 | 7.0 | 1.5 |
| Ex 2 | A | 44 | 0 | 0 | 0.03 | 0.05 | 0 | 10 | 0 |
| | B | 36 | 0 | 2.0 | 0 | 0 | 0 | 6.0 | 0 |
| Ex 3 | A | 40 | 0 | 0 | 0.1 | 0 | 0.1 | 8.0 | 0 |
| | B | 40 | 0 | 6.0 | 0 | 0 | 0 | 8.0 | 0 |
| Ex 4 | A | 46 | 0 | 0 | 0.5 | 0.4 | 0 | 6.0 | 1.5 |
| | B | 34 | 0 | 2.5 | 0 | 0 | 0 | 6.0 | 1.5 |
| Ex 5 | A | 46 | 0 | 0 | 1.0 | 0.8 | 0 | 6.0 | 1.5 |
| | B | 34 | 0 | 3.5 | 0 | 0 | 0 | 6.0 | 1.5 |
| Ex 6 | A | 46 | 0 | 0 | 1.0 | 0.8 | 0 | 9.0 | 0 |
| | B | 34 | 0 | 3.5 | 0 | 0 | 0 | 7.0 | 0 |
| Ex 7 | A | 46 | 0 | 0 | 1.0 | 0.8 | 0 | 9.0 | 0 |
| | B | 34 | 0 | 3.5 | 0 | 0 | 0 | 7.0 | 0 |
| Ex 8 | A | 46 | 0 | 0 | 1.0 | 0.8 | 0 | 9.0 | 0 |
| | B | 34 | 0 | 3.5 | 0 | 0 | 0 | 7.0 | 0 |
| Ex 9 | A | 46 | 0 | 0 | 1.0 | 0.8 | 0 | 9.0 | 0 |
| | B | 34 | 0 | 2.5 | 0 | 0 | 0 | 7.0 | 0 |
| Ex 10 | A | 46 | 0 | 0 | 1.0 | 0.8 | 0 | 9.0 | 0 |
| | B | 34 | 0 | 4.5 | 0 | 0 | 0 | 7.0 | 0 |
| Ex 11 | A | 41 | 5 | 0 | 1.0 | 0.8 | 0 | 9.0 | 0 |
| | B | 29 | 5 | 3.5 | 0 | 0 | 0 | 7.0 | 0 |

TABLE 2-continued

Part A and B Formulations (in grams)

| | | | | | | | | | |
|---|---|---|---|---|---|---|---|---|---|
| Ex 12 | A | 46 | 0 | 0 | 1.0 | 0 | 0.3 | 9.0 | 0 |
| | B | 34 | 0 | 3.5 | 0 | 0 | 0 | 7.0 | 0 |
| Ex 13 | A | 46 | 0 | 0 | 1.0 | 0.8 | 0 | 9.0 | 0 |
| | B | 34 | 0 | 3.5 | 0 | 0 | 0 | 7.0 | 0 |
| Ex 14 | A | 46 | 0 | 0 | 1.0 | 0.8 | 0 | 9.0 | 0 |
| | B | 34 | 0 | 3.5 | 0 | 0 | 0 | 7.0 | 0 |
| Ex 15 | A | 46 | 0 | 0 | 0.1 | 0.2 | 0 | 9.0 | 0 |
| | B | 34 | 0 | 3.5 | 0 | 0 | 0 | 7.0 | 0 |
| Ex 16 | A | 46 | 0 | 0 | 1.0 | 0.8 | 0 | 9.0 | 0 |
| | B | 34 | 0 | 3.5 | 0 | 0 | 0 | 7.0 | 0 |
| Ex 17 | A | 46 | 0 | 0 | 1.0 | 0.8 | 0 | 9.0 | 0 |
| | B | 34 | 0 | 3.5 | 0 | 0 | 0 | 7.0 | 0 |
| Ex 18 | A | 46 | 0 | 0 | 1.0 | 0.8 | 0 | 9.0 | 0 |
| | B | 34 | 0 | 4.0 | 0 | 0 | 0 | 7.0 | 0 |

| | Part | Expancel 920 DET 40 | FN-80SDE | MFL-110CAL | VORA-SURF™ DC | Glycol | Propanol | ADT1002 | ADT35 |
|---|---|---|---|---|---|---|---|---|---|
| Ex 1 | A | 0 | 0 | 1.0 | 0 | 0 | 0 | 8.0 | 0 |
| | B | 0 | 0 | 1.0 | 0 | 0 | 0 | 0 | 0 |
| Ex 2 | A | 0.49 | 0 | 0 | 0 | 0 | 0 | 0 | 0 |
| | B | 0.47 | 0 | 0 | 0 | 0 | 0 | 0 | 8 |
| Ex 3 | A | 0.44 | 0 | 0 | 0 | 0 | 0 | 0 | 4 |
| | B | 0.44 | 0 | 0 | 0 | 0 | 0 | 0 | 4 |
| Ex 4 | A | 0.44 | 0 | 0 | 0 | 0 | 0 | 0 | 0 |
| | B | 0.44 | 0 | 0 | 0 | 0.35 | 0 | 0 | 8 |
| Ex 5 | A | 0 | 0 | 1.0 | 0 | 0 | 0 | 0 | 0 |
| | B | 0 | 0 | 1.0 | 0 | 0 | 0 | 8.0 | 0 |
| Ex 6 | A | 0 | 0 | 1.0 | 0.1 | 0.4 | 0 | 0 | 0 |
| | B | 0 | 0 | 1.0 | 0 | 0 | 0 | 8.0 | 0 |
| Ex 7 | A | 0 | 0 | 1.0 | 0.1 | 0.3 | 0 | 0 | 0 |
| | B | 0 | 0 | 1.0 | 0 | 0 | 0 | 8.0 | 0 |
| Ex 8 | A | 0 | 0 | 1.0 | 0.1 | 0.2 | 0 | 0 | 0 |
| | B | 0 | 0 | 1.0 | 0 | 0 | 0 | 8.0 | 0 |
| Ex 9 | A | 0 | 0 | 1.0 | 0.1 | 0.3 | 0 | 0 | 0 |
| | B | 0 | 0 | 1.0 | 0 | 0 | 0 | 8.0 | 0 |
| Ex 10 | A | 0 | 0 | 1.0 | 0.1 | 0.3 | 0 | 0 | 0 |
| | B | 0 | 0 | 1.0 | 0 | 0 | 0 | 8.0 | 0 |
| Ex 11 | A | 0 | 0 | 1.0 | 0.1 | 0.3 | 0 | 0 | 0 |
| | B | 0 | 0 | 1.0 | 0 | 0 | 0 | 8.0 | 0 |
| Ex 12 | A | 0 | 0 | 1.0 | 0.1 | 0.3 | 0 | 0 | 0 |
| | B | 0 | 0 | 1.0 | 0 | 0 | 0 | 8.0 | 0 |
| Ex 13 | A | 0.5 | 0 | 0 | 0.1 | 0.3 | 0 | 0 | 0 |
| | B | 0.5 | 0 | 0 | 0 | 0 | 0 | 8.0 | 0 |
| Ex 14 | A | 0 | 0 | 1.0 | 0.1 | 0 | 0. | 0 | 0 |
| | B | 0 | 0 | 1.0 | 0 | 0 | 0 | 8.0 | 0 |
| Ex 15 | A | 0 | 0 | 1.0 | 0.1 | 0 | 0. | 0 | 0 |
| | B | 0 | 0 | 1.0 | 0 | 0 | 0 | 8.0 | 0 |
| Ex 16 | A | 0 | 0 | 1.0 | 0.1 | 0.3 | 0 | 0 | 0 |
| | B | 0 | 0 | 1.0 | 0 | 0 | 0 | 4.0 | 0 |
| Ex 17 | A | 0 | 0.5 | 0 | 0.1 | 0.3 | 0 | 0 | 0 |
| | B | 0 | 0.5 | 0 | 0 | 0 | 0 | 8.0 | 0 |
| Ex 18 | A | 0 | 0 | 1.0 | 0 | 0 | 0 | 0 | 0 |
| | B | 0 | 0 | 1.0 | 0 | 0 | 0 | 8.0 | 0 |

TABLE 3

Test Results

| Example | Compression Set at 85° C. (%) | Density (kg/m³) | Tack Free Time (min) | Waterproof | Flame Test |
|---|---|---|---|---|---|
| Ex 1 | <20 | 605 | <10 | N/A | V0 |
| Ex 2 | <20 | 610 | >20 | N/A | N/A |
| Ex 3 | <20 | 600 | >10 | N/A | V0 |
| Ex 4 | <20 | 453 | <10 | N/A | N/A |
| Ex 5 | 15 | 6.92 | <10 | IP68 | V0 |
| Ex 6 | 23.8 | 313 | <10 | N/A | V0 |
| Ex 7 | 10.9 | 390 | <10 | IP68 | V0 |
| Ex 8 | 13.3 | 420 | <10 | IP68 | V0 |
| Ex 9 | 15.6 | 510 | <10 | N/A | V0 |
| Ex 10 | 20.2 | 410 | <10 | N/A | V0 |
| Ex 11 | 14.6 | 482 | <10 | IP68 | V0 |
| Ex 12 | 11.4 | 400 | 15-20 | IP68 | V0 |
| Ex 13 | 13.2 | 360 | <10 | N/A | V0 |
| Ex 14 | 32 | 432 | <10 | IP68 | V0 |
| Ex 15 | 28 | 463 | >20 | N/A | V0 |
| Ex 16 | 16 | 479 | <10 | N/A | V0 |
| Ex 17 | 15.3 | 407 | <10 | N/A | V0 |
| Ex 18 | 9.2 | 679 | <10 | IP68 | V0 |

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present disclosure. Thus, it should be understood that although the present disclosure has been specifically disclosed by specific embodiments and optional features, modification and variation of the concepts herein disclosed may be resorted to by those of ordinary skill in the art, and that such modifications and variations are considered to be within the scope of embodiments of the present disclosure.

Additional Embodiments

The following exemplary embodiments are provided, the numbering of which is not to be construed as designating levels of importance:

Embodiment 1 provides a curable silicone composition comprising:
 a vinyl polysiloxane component;
 a hydrogen polysiloxane component;
 a polymerization catalyst; and
 an expandable graphite component comprising moisture.

Embodiment 2 provides a curable silicone composition comprising:
 a first part comprising:
  a vinyl polysiloxane component; and
  a polymerization catalyst; and
 a second part comprising:
  optionally the vinyl polysiloxane component; and
  a hydrogen polysiloxane component, wherein the first part, the second part, or both comprise an expandable graphite component comprising moisture.

Embodiment 3 provides the curable silicone composition of any one of Embodiments 1 or 2, wherein the composition is curable at a temperature in a range of from about 0° C. to about 40° C.

Embodiment 4 provides the curable silicone composition of any one of Embodiments 1-3, wherein the composition is curable at a temperature in a range of from about 15° C. to about 30° C.

Embodiment 5 provides the curable silicone composition of any one of Embodiments 1-4, wherein the vinyl polysiloxane component is in a range of from about 20 wt % to about 90 wt % of the curable composition.

Embodiment 6 provides the curable silicone composition of any one of Embodiments 1-5 wherein the vinyl polysiloxane component is in a range of from about 29 wt % to about 80 wt % of the curable composition.

Embodiment 7 provides the curable silicone composition of any one of Embodiments 1-6, wherein the vinyl polysiloxane component is in a range of from about 34 wt % to about 46 wt % of the curable composition.

Embodiment 8 provides the curable silicone composition of any one of Embodiments 1-7, wherein the vinyl polysiloxane component comprises a vinyl polysiloxane having a structure according to Formula I:

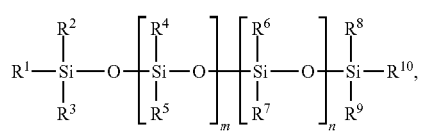

(I)

wherein
 $R^1$, $R^2$, $R^3$, $R^4$, $R^5$, $R^6$, $R^7$, $R^8$, $R^9$, and $R^{10}$, are independently chosen from —H, —OH, and substituted or unsubstituted ($C_1$-$C_{20}$)hydrocarbyl;
 at least one of $R^1$, $R^4$, $R^5$, and $R^{10}$, comprises a vinyl group;
 m is any positive integer;
 n is zero or any positive integer; and
 m and n are in random or block orientation.

Embodiment 9 provides the curable silicone composition of Embodiment 8, wherein $R^1$, $R^2$, $R^3$, $R^4$, $R^5$, $R^6$, $R^7$, $R^8$, $R^9$, and $R^{10}$ are independently chosen from —H, —OH, substituted or unsubstituted ($C_1$-$C_{20}$)alkyl, ($C_1$-$C_{20}$)alkenyl, ($C_1$-$C_{20}$)alkynyl, ($C_1$-$C_{20}$)acyl, ($C_1$-$C_{20}$)cycloalkyl, ($C_1$-$C_{20}$)aryl, ($C_1$-$C_{20}$)alkoxyl, and ($C_1$-$C_{20}$)haloalkyl.

Embodiment 10 provides the curable silicone composition of any one of Embodiments 8 or 9, wherein the vinyl polysiloxane component comprises one or more vinyl polysiloxanes independently having a structure according to at least one of Formula II and Formula III:

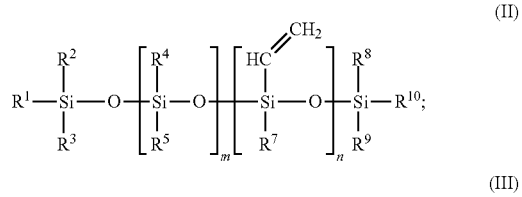

(II)

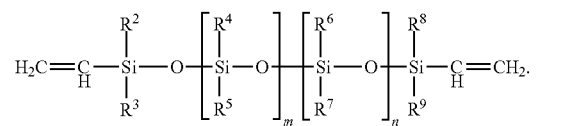

(III)

Embodiment 11 provides the curable silicone composition of any one of Embodiments 8-10, wherein the vinyl polysiloxane component comprises a vinyl polysiloxane having the structure according to Formula IV:

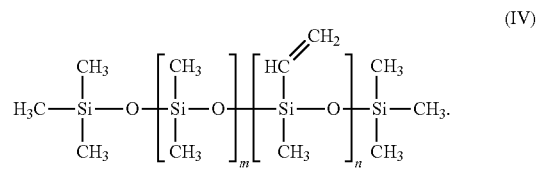

(IV)

Embodiment 12 provides the curable silicone composition of any one of Embodiments 8-11, wherein the vinyl polysiloxane component comprises a vinyl polysiloxane having the structure according to Formula V:

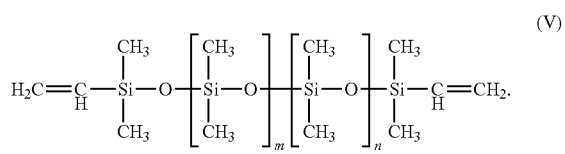

(V)

Embodiment 13 provides the curable silicone composition of any one of Embodiments 1-12, wherein the vinyl polysiloxane component comprises one or more vinyl polysiloxanes independently having a viscosity in a range of from about 100 mPa-s to about 500,000 mPa-s at 25° C.

Embodiment 14 provides the curable silicone composition of any one of Embodiments 1-13, wherein the vinyl polysiloxane component comprises one or more vinyl polysiloxanes independently having a viscosity in a range of from about 200 mPa-s to about 300,000 mPa-s at 25° C.

Embodiment 15 provides the curable silicone composition of any one of Embodiments 1-14, wherein the vinyl polysiloxane component has a vinyl content in a range of from about 0.0010 mmol/g to about 5 mmol/g.

Embodiment 16 provides the curable silicone composition of any one of Embodiments 1-15, wherein the vinyl polysiloxane component has a vinyl content in a range of from about 0.005 mmol/g to about 0.1 mmol/g.

Embodiment 17 provides the curable silicone composition of any one of Embodiments 1-16, wherein the vinyl polysiloxane component comprises one or more vinyl polysiloxane homopolymers, vinyl polysiloxane copolymers, or combinations thereof.

Embodiment 18 provides the curable silicone composition of any one of Embodiments 1-17, wherein hydrogen polysiloxane component is in a range of from about 0.5 wt % to about 20 wt % of the curable composition.

Embodiment 19 provides the curable silicone composition of any one of Embodiments 1-18, wherein the hydrogen polysiloxane component is in a range of from about 1.0 wt % to about 15 wt % of the curable composition.

Embodiment 20 provides the curable silicone composition of any one of Embodiments 1-19, wherein the hydrogen polysiloxane component comprises a hydrogen polysiloxane polymer having a structure according to Formula VI:

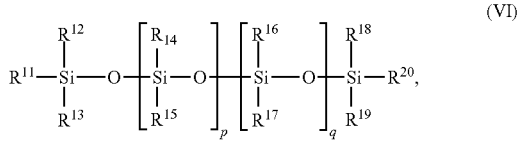

(VI)

wherein $R^{11}$, $R^{12}$, $R^{13}$, $R^{14}$, $R^{15}$, $R^{16}$, $R^{17}$, $R^{18}$, $R^{19}$, and $R^{20}$ are independently chosen from —H, —OH, substituted or unsubstituted $(C_1-C_{20})$hydrocarbyl and at least one of $R^{11}$, $R^{14}$, $R^{15}$, and $R^{20}$, is —H;

p is any positive integer;
q is zero or any positive integer; and
p and q are in random or block orientation.

Embodiment 21 provides the curable silicone composition of Embodiment 20, wherein $R^{11}$, $R^{12}$, $R^{13}$, $R^{14}$, $R^{15}$, $R^{16}$, $R^{17}$, $R^{18}$, $R^{19}$, and $R^{20}$ are independently chosen from —H, —OH, substituted or unsubstituted $(C_1-C_{20})$alkyl, $(C_1-C_{20})$alkenyl, $(C_1-C_{20})$alkynyl, $(C_1-C_{20})$acyl, $(C_1-C_{20})$cycloalkyl, $(C_1-C_{20})$aryl, $(C_1-C_{20})$alkoxyl, and $(C_1-C_{20})$haloalkyl.

Embodiment 22 provides the curable silicone composition of any one of Embodiments 20 or 21, wherein the hydrogen polysiloxane component comprises one or more hydrogen polysiloxane polymers independently having a structure according to at least one of Formula VII and Formula VIII:

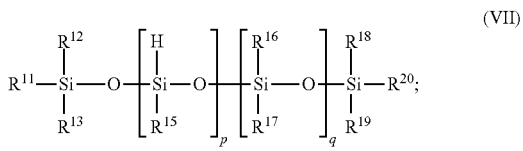

(VII)

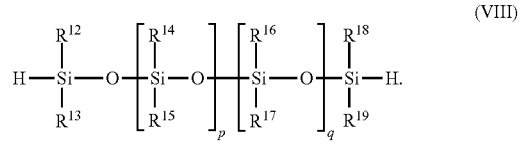

(VIII)

Embodiment 23 provides the curable silicone composition of any one of Embodiments 20-22, wherein the hydrogen polysiloxane component comprises a hydrogen polysiloxane polymer having a structure according to Formula IX:

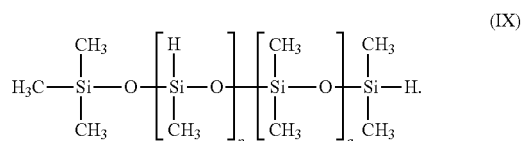

(IX)

Embodiment 24 provides the curable silicone composition of any one of Embodiments 22 or 23, wherein the hydrogen polysiloxane component comprises a hydrogen polysiloxane polymer having a structure according to Formula X:

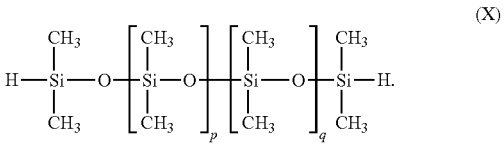

(X)

Embodiment 25 provides the curable silicone composition of any one of Embodiments 1-24, wherein the polymerization catalyst comprises platinum.

Embodiment 26 provides the curable silicone composition of any one of Embodiments 1-25, wherein the polymerization catalyst is in a range of from about 1 ppm to about 1000 ppm of the curable composition based on the amount of platinum.

Embodiment 27 provides the curable silicone composition of any one of Embodiments 1-26, wherein the polymerization catalyst is in a range of from about 10 ppm to about 250 ppm of the curable composition based on the amount of platinum.

Embodiment 28 provides the curable silicone composition of any one of Embodiments 1-27, wherein the polymerization catalyst comprises bis(acetylacetonato)platinum (ii), cis-diamminedichloroplatinum(ii), di-μ-chloro-bis[chloro(cyclohexene)platinum(ii)], cis-dichlorobis(triphenylphosphane)platinum(ii), dichloro(cycloocta-1.5-diene)platinum(ii), dihydrogen hexachloroplatinate(iv) hydrate, dihydrogen hexachloroplatinate(iv), platinum(0) divinyltetramethylsiloxane complex, tetrakis(triphenylphosphane)platinum(0), dihydrogen hexachloroplatinate(iv) solution, or mixtures thereof.

Embodiment 29 provides the curable silicone composition of any one of Embodiments 1-28, wherein the expandable graphite component comprising moisture comprises a plurality of graphite flakes having a mesh size independently in a range of from about 20 mesh to about 350 mesh.

Embodiment 30 provides the curable silicone composition of any one of Embodiments 1-29, wherein the expandable graphite component comprises a plurality of graphite flakes having a mesh size independently in a range of from about 50 mesh to about 200 mesh.

Embodiment 31 provides the curable silicone composition of any one of Embodiments 1-30, wherein the expandable graphite component comprises a plurality of graphite flakes independently having a moisture content in a range of from about 0.05 wt % to about 5 wt % per graphite flake.

Embodiment 32 provides the curable silicone composition of any one of Embodiments 1-31, wherein the expandable graphite component comprises a plurality of graphite flakes independently having a moisture content in a range of from about 0.1 wt % to about 2 wt % per graphite flake.

Embodiment 33 provides the curable silicone composition of any one of Embodiments 1-32, wherein the expandable graphite component is in a range of from about 0.05 wt % to about 30 wt % of the curable composition.

Embodiment 34 provides the curable silicone composition of any one of Embodiments 1-33, wherein the expandable graphite component is in a range of from about 2 wt % to about 15 wt % of the curable composition.

Embodiment 35 provides the curable silicone composition of any one of Embodiments 1-34, further comprising water.

Embodiment 36 provides the curable silicone composition of any one of Embodiments 1-35, further comprising a microsphere component.

Embodiment 37 provides the curable silicone composition of Embodiment 36, wherein the microsphere component is in a range of from about 0.05 wt % to about 10 wt % of the curable composition.

Embodiment 38 provides the curable silicone composition of any one of Embodiments 36 or 37, wherein the microsphere component is in a range of from about 0.30 wt % to about 2 wt % of the curable composition.

Embodiment 39 provides the curable silicone composition of any one of Embodiments 36-38, wherein the microsphere component comprises a plurality of microspheres chosen from polymer microspheres, glass microspheres, ceramic microspheres, or combinations thereof.

Embodiment 40 provides the curable silicone composition of any one of Embodiments 36-39, wherein the microsphere component comprises a plurality of polymer microspheres.

Embodiment 41 provides the curable silicone composition of any one of Embodiments 39 or 40, wherein at least one of the plurality comprises an acrylonitrile/acrylate copolymer, a vinylidenechloride/acrylonitrile copolymer, or a mixture thereof.

Embodiment 42 provides the curable silicone composition of Embodiment 41, wherein the at least one of the hollow microspheres comprises a gas disposed therein.

Embodiment 43 provides the curable silicone composition of any one of Embodiments 40-42, wherein a $D_{50}$ of the plurality of microspheres is in a range of from about 1 μm to about 500 μm.

Embodiment 44 provides the curable silicone composition of any one of Embodiments 40-43, wherein a $D_{50}$ of the plurality of microspheres is in a range of from about 20 μm to about 250 μm.

Embodiment 45 provides the curable silicone composition of any one of Embodiments 1-44, further comprising a reaction inhibitor component.

Embodiment 46 provides the curable silicone composition of Embodiment 45, wherein the reaction inhibitor component comprises 1,3,5,7-tetramethyl-1,3,5,7-tetravinyl-cyclotetrasiloxane, 1,3-divinyl tetramethyl disiloxane, 2-methyl-3-butyn-2-ol, 2-phenyl-3-butyn-2-ol, 3,5-dimethyl-1-hexyn-3-ol, 1-ethynyl-1-cyclohexanol, 1,5-hexadiene, 1,6-heptadiene; 3,5-dimethyl-1-hexen-lyne, 3-ethyl-3-buten-1-yne and/or 3-phenyl-3-buten-1-yne; 1,3-divinyltetramethyldisiloxane, 1,3,5,7-tetravinyltetramethyl cyclotetrasiloxane, 1,3-divinyl-1,3-diphenyldimethyldisiloxane, methyltris (3-methyl-1-butyn-3-oxy) silane, or a mixture thereof.

Embodiment 47 provides the curable silicone composition of any one of Embodiments 45 or 46, wherein the reaction retardant component is in a range of from about 0.01 wt % to about 5 wt % of the curable composition.

Embodiment 48 provides the curable silicone composition of any one of Embodiments 45-47 wherein the reaction retardant component is in a range of from about 0.05 wt % to about 2 wt % of the curable composition.

Embodiment 49 provides the curable silicone composition of any one of Embodiments 1-48, further comprising a particulate filler.

Embodiment 50 provides the curable silicone composition of Embodiment 49, wherein the particulate filler comprises an inorganic particulate filler.

Embodiment 51 provides the curable silicone composition of any one of Embodiments 49 or 50, wherein the particulate filler comprises a glass, a ceramic, a mineral, a silica, or a mixture thereof.

Embodiment 52 provides the curable silicone composition of any one of Embodiments 49-51, wherein the particulate filler comprises hydrophobic fumed silica, hydrophobic pyrogenic silica, or a mixture thereof.

Embodiment 53 provides the curable silicone composition of any one of Embodiments 49-52, wherein the particulate filler is in a range of from about 2 wt % to about 30 wt % of the curable composition.

Embodiment 54 provides the curable silicone composition of any one of Embodiments 49-53, wherein the particulate filler is in a range of from about 5 wt % to about 15 wt % of the curable composition.

Embodiment 55 provides the curable silicone composition of any one of Embodiments 1-54, further comprising an alcohol component.

Embodiment 56 provides the curable silicone composition of Embodiment 55, wherein the alcohol component is in a range of from about 0.01 wt % to about 5 wt % of the curable composition.

Embodiment 57 provides the curable silicone composition of any one of Embodiments 55 or 56, wherein the alcohol component is in a range of from about 0.01 wt % to about 1 wt % of the curable composition.

Embodiment 58 provides the curable silicone composition of any one of Embodiments 55-57, wherein the alcohol component comprises a polyfunctional alcohol.

Embodiment 59 provides the curable silicone composition of any one of Embodiments 55-58, wherein the alcohol component comprises propanol, glycol, or a mixture thereof.

Embodiment 60 provides a curable silicone composition comprising:
a vinyl polysiloxane component having a structure according to Formula I:

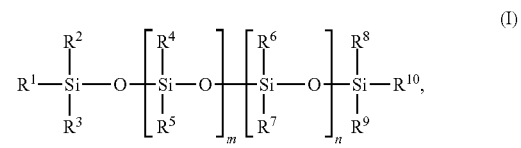

wherein $R^1$, $R^2$, $R^3$, $R^4$, $R^5$, $R^6$, $R^7$, $R^8$, $R^9$, and $R^{10}$, are independently chosen from —H, —OH, and substituted or unsubstituted ($C_1$-$C_{20}$)hydrocarbyl;

at least one of $R^1$, $R^4$, $R^5$, and $R^{10}$, comprises a vinyl group;

m is any positive integer;

n is zero or any positive integer; and m and n are in random or block orientation;

a hydrogen polysiloxane component having a structure according to Formula VI:

$$R^{11}-\underset{\underset{R^{13}}{|}}{\overset{\overset{R^{12}}{|}}{Si}}-O-\left[\underset{\underset{R^{15}}{|}}{\overset{\overset{R^{14}}{|}}{Si}}-O\right]_p\left[\underset{\underset{R^{17}}{|}}{\overset{\overset{R^{16}}{|}}{Si}}-O\right]_q\underset{\underset{R^{19}}{|}}{\overset{\overset{R^{18}}{|}}{Si}}-R^{20}, \quad (VI)$$

wherein $R^{11}$, $R^{12}$, $R^{13}$, $R^{14}$, $R^{15}$, $R^{16}$, $R^{17}$, $R^{18}$, $R^{19}$, and $R^{20}$ are independently chosen from —H, —OH, substituted or unsubstituted ($C_1$-$C_{20}$)hydrocarbyl and at least one of $R^{11}$, $R^{14}$, $R^5$, and $R^{20}$, is —H;

p is any positive integer;

q is zero or any positive integer; and p and q are in random or block orientation;

a polymerization catalyst comprising platinum;

an expandable graphite component comprising a plurality of graphite flakes; and a polymer microsphere component.

Embodiment 61 provides a cured product of the curable silicone composition of any one of Embodiments 1-60.

Embodiment 62 provides the cured product of Embodiment 61, wherein the cured product comprises:

a first surface;

a second surface spaced from the first surface; and a layer of the cured product between the first surface and the second surface.

Embodiment 63 provides the cured product of any one of Embodiments 61 or 62, further comprising a plurality of foamed cells dispersed throughout the matrix.

Embodiment 64 provides the cured product of Embodiment 63, wherein the plurality of foamed cells are uniformly dispersed throughout the matrix.

Embodiment 65 provides the cured product of any one of Embodiments 63 or 64, wherein a distance in the x-direction, y-direction, z-direction, or any combination thereof between adjacent foamed cells is substantially the same throughout the matrix.

Embodiment 66 provides the cured product of Embodiment 65, wherein the distance is in a range of from about 5 µm to about 5 mm.

Embodiment 67 provides the cured product of any one of Embodiments 65 or 66, wherein the distance is in a range of from about 0.2 mm to about 2 mm.

Embodiment 68 provides the cured product of any one of Embodiments 64-67, wherein a $D_{50}$ of the foamed cells is in a range of from about 1 µm to about 5000 µm.

Embodiment 69 provides the cured product of any one of Embodiments 64-68, wherein a $D_{50}$ of the foamed cells is in a range of from about 20 µm to about 1000 µm.

Embodiment 70 provides the cured product of any one of Embodiments 64-69, wherein a $D_{98}$ of the foamed cells is in a range of from about 1 µm to about 5000 µm.

Embodiment 71 provides the cured product of any one of Embodiments 64-70, wherein a $D_{98}$ of the foamed cells is in a range of from about 20 µm to about 2000 µm.

Embodiment 72 provides the cured product of any one of Embodiments 62-71, wherein the first surface, the second surface, or both are substantially smooth.

Embodiment 73 provides the cured product of any one of Embodiments 62-72, wherein a density of the cured product is in a range of from about 0.200 g/cm$^3$ to about 0.800 g/cm$^3$.

Embodiment 74 provides the cured product of any one of Embodiments 62-73, wherein a density of the cured product is in a range of from about 0.300 g/cm$^3$ to about 0.700 g/cm$^3$.

Embodiment 75 provides the cured product of any one of Embodiments 62-74, wherein a compression set ratio of the cured product measured at about 85° C. is in a range of from about 0% to about 60%.

Embodiment 76 provides the cured product of any one of Embodiments 62-75, wherein a compression set ratio of the cured product measured at about 85° C. is in a range of from about 0% to about 40%.

Embodiment 77 provides the cured product of any one of Embodiments 62-76, wherein the first major surface, the second major surface, or a combination thereof are non-tacky.

Embodiment 78 provides the cured product of any one of Embodiments 62-77, wherein the cured product is substantially flame retardant.

Embodiment 79 provides the cured product of any one of Embodiments 62-78, wherein the cured product is substantially flame retardant as determined by at least a UL 94 standard, V2, V1 and V0 rating.

Embodiment 80 provides the cured product of any one of Embodiments 62-79, wherein the cured product is substantially water proof.

Embodiment 81 provides the cured product of any one of Embodiments 62-70, wherein the cured product is substantially water proof as determined by International Protection Marketing standard IP68.

Embodiment 82 provides the cured product of any one of Embodiments 62-81, wherein the cured product is foamed sealer.

Embodiment 83 provides the cured product of any one of Embodiments 62-82, wherein the cured product is a cured-in-place compression sealer.

Embodiment 84 provides an assembly comprising:

a first substrate;

a second substrate; and the cured product of any one of Embodiments 62-83, in contact with the first substrate and the second substrate.

Embodiment 85 provides the assembly of Embodiment 84, wherein the first substrate is in contact with the first surface of the cured product and the second substrate is in contact with the second surface of the cured product.

Embodiment 86 provides the assembly of any one of Embodiments 84 or 85, wherein the cured product is:

adhered to the first substrate and free of adhesion to the second substrate; or free of adhesion the first substrate and adhered to the second substrate.

Embodiment 87 provides the assembly of any one of Embodiments 84-86, wherein the cured product is in continuous contact with the first substrate and the second substrate.

Embodiment 88 provides the assembly of any one of Embodiments 84-87, wherein the assembly is free of a gap between the cured product and the first substrate and second substrate.

Embodiment 89 provides the assembly of any one of Embodiments 84-88, wherein the first substrate and the second substrate are removably secured to each other.

Embodiment 90 provides the assembly of any one of Embodiments 84-89, further comprising a clamp adapted to removably secure the first substrate and the second substrate to each other.

Embodiment 91 provides the assembly of any one of Embodiments 84-90, wherein the first substrate and the second substrate enclose a void defined therebetween.

Embodiment 92 provides the assembly of Embodiment 91, further comprising an electronic component located at least partially within the void.

Embodiment 93 provides the assembly of Embodiment 92, wherein the electronic component is a battery.

Embodiment 94 provides the assembly of any one of Embodiments 84-93, wherein the assembly is a battery box.

Embodiment 95 provides a vehicle comprising the assembly of any one of Embodiments 84-94.

Embodiment 96 provides the vehicle of Embodiment 95, wherein the vehicle is an automobile, a train, an aerospace vehicle, or a watercraft.

Embodiment 97 provides a method of making the curable silicone composition of any one of Embodiments 1-96, the method comprising:
  providing or receiving a two-part precursor composition, wherein
    a first part comprises:
      the vinyl polysiloxane component;
      the polymerization catalyst; and
    a second part comprises:
      the vinyl polysiloxane component;
      optionally the hydrogen polysiloxane component, wherein the first part,
    the second part, or both comprise the expandable graphite component comprising moisture; and combining the first part and the second part to form a mixture.

Embodiment 98 provides the method of Embodiment 97, wherein the vinyl polysiloxane component is independently in a range of from about 20 wt % to about 85 wt % of the first part and the second part.

Embodiment 99 provides the method of any one of Embodiments 97 or 98, wherein the vinyl polysiloxane component is independently in a range of from about 50 wt % to about 80 wt % of the first part and the second part.

Embodiment 100 provides the method of any one of Embodiments 97-99, wherein the polymerization catalyst comprises platinum in a range of from about 3 ppm to about 500 ppm of the first part.

Embodiment 101 provides the method of any one of Embodiments 97-100, wherein the polymerization catalyst comprises platinum in a range of from about 5 ppm to about 200 ppm of the first part.

Embodiment 102 provides the method of any one of Embodiments 97-101, wherein the hydrogen polysiloxane component is in a range of from about 0.5 wt % to about 30 wt % of the second part.

Embodiment 103 provides the method of any one of Embodiments 97-102, wherein the hydrogen polysiloxane component is in a range of from about 5 wt % to about 20 wt % of the second part.

Embodiment 104 provides the method of any one of Embodiments 97-103, wherein the expandable graphite component is independently in a range of from about 0 wt % to about 20 wt % of the first part or the second part.

Embodiment 105 provides the method of any one of Embodiments 97-104, wherein the expandable graphite component is independently in a range of from about 0.05 wt % to about 10 wt % of the first part or the second part.

Embodiment 106 provides the method of any one of Embodiments 97-105, wherein the first part further comprises a reaction retardant.

Embodiment 107 provides the method of Embodiment 106, wherein the reaction retardant is in a range of from about 0.05 wt % to about 5 wt % of the first part.

Embodiment 108 provides the method of any one of Embodiments 106 or 107, wherein the reaction retardant is in a range of from about 0.1 wt % to about 2 wt % of the first part.

Embodiment 109 provides the method of any one of Embodiments 97-108, wherein the first part, the second part or both comprise a particulate filler.

Embodiment 110 provides the method of Embodiment 109, wherein the particulate filler is independently in a range of from about 0 wt % to about 30 wt % of the first part, the second part, or both.

Embodiment 111 provides the method of any one of Embodiments 109 or 110, wherein the particulate filler is independently in a range of from about 5 wt % to about 20 wt % of the first part, the second part, or both.

Embodiment 112 provides the method of any one of Embodiments 97-111, wherein the first part, the second part or both comprise the alcohol component.

Embodiment 113 provides the method of Embodiment 112, wherein the alcohol component is independently in a range of from about 0 wt % to about 10 wt % of the first part, the second part, or both.

Embodiment 114 provides the method of any one of Embodiments 112 or 113, wherein the alcohol component is independently in a range of from about 0.2 wt % to about 5 wt % of the first part, the second part, or both.

Embodiment 115 provides the method of any one of Embodiments 97-114, wherein the first part, the second part or both comprise the water component.

Embodiment 116 provides the method of any one of Embodiments 97-115, wherein the first part and the second part are combined at a volume to volume ratio in a range of from about 5:100 to about 100:1.

Embodiment 117 provides the method of any one of Embodiments 97-116, wherein the first part and the second part are combined and mixed.

Embodiment 118 provides the method of any one of Embodiments 97-117, further comprising curing the curable composition.

Embodiment 119 provides a system for performing the method according to any one of Embodiments 97-118, the system comprising:
  a first holding chamber; and
  a second holding chamber.

Embodiment 120 provides the system of Embodiment 119, further comprising at least one of:
  a dispenser in fluid communication with the first holding chamber and the second holding chamber; and
  a mixing tip in fluid communication with the first holding chamber and the second holding chamber.

Embodiment 121 provides the system of Embodiment 119, further comprising a mixing chamber in fluid communication with the first holding chamber, the second holding chamber, and the dispenser, wherein the mixing chamber is upstream of the dispenser.

Embodiment 122 provides the system of any one of Embodiment 119 or 120, further comprising:
  a first pump in fluid communication with the first holding chamber and the mixing chamber; and a second pump in fluid communication with the second holding chamber and the mixing chamber, wherein the first pump and the second pump are located upstream of the mixing chamber.

Embodiment 123 provides the system of Embodiment 121, further comprising a plunger component movable between a first position and a second position in the first holding chamber and the second holding chamber.

Embodiment 124 provides the system of any one of Embodiments 119-123, wherein the first part is located in the first holding chamber and the second part is located in the second holding chamber.

Embodiment 125 provides a method of making the cured product of any one of Embodiments 61-83, the method comprising curing the curable composition of any one of Embodiments 1-60 or formed according to the method of any one of Embodiments 97-118.

Embodiment 126 provides the method of Embodiment 125, wherein the curable composition is cured for an amount of time ranging from about 0.5 minutes to about 24 hours.

Embodiment 127 provides the method of any one of Embodiments 125 or 126, wherein the curable composition is cured for an amount of time ranging from about 0.5 minutes to about 10 hours.

Embodiment 128 provides the method of any one of Embodiments 125-127, wherein the curable composition is cured at a temperature in a range of from about 15° C. to about 45° C.

Embodiment 129 provides the method of any one of Embodiments 125-128, wherein the curable composition is cured at a temperature in a range of from about 20° C. to about 30° C.

Embodiment 130 provides a method of forming the assembly of any one of Embodiments 84-94, the method comprising dispensing the curable composition of any one of Embodiments 1-60 or formed according to the method according to any one of Embodiments 97-118, the method comprising:

contacting the curable composition with the first substrate or the second substrate;

forming the cured composition according the method of any one of Embodiments 125-129;

contacting the first substrate or the second substrate with the cured composition; and applying pressure to the first substrate and the second substrate.

Embodiment 131 provides the method of Embodiment 130, further comprising curing the curable composition.

The invention claimed is:

1. A curable silicone composition comprising:
a vinyl polysiloxane component;
a hydrogen polysiloxane component;
a polymerization catalyst; and
an expandable graphite component comprising moisture, wherein the expandable graphite component comprises a plurality of graphite flakes independently having a moisture content being pre-absorbed or preblended thereon in a range of from about 0.05 wt % to about 5 wt % per graphite flake, the moisture content being reactive with the hydrogen polysiloxane to create hydrogen gas and form foamed cells when the curable silicone composition is cured,
wherein the hydrogen polysiloxane component comprises a hydrogen polysiloxane polymer having the following structure:

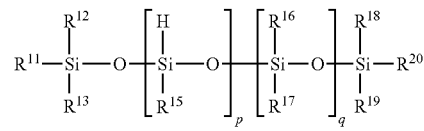

wherein
$R^{11}$, $R^{12}$, $R^{13}$, $R^{15}$, $R^{16}$, $R^{17}$, $R^{18}$, $R^{19}$, and $R^{20}$ are independently chosen from —H, —OH, and substituted or unsubstituted ($C_1$-$C_{20}$)hydrocarbyl;
at least one of $R^{11}$, $R^{15}$, and $R^{20}$ is —H;
p is any positive integer; and
q is zero or any positive integer.

2. The curable silicone composition of claim 1, wherein the vinyl polysiloxane component comprises a vinyl polysiloxane having a structure according to Formula I:

(I), wherein
$R^1$, $R^2$, $R^3$, $R^4$, $R^5$, $R^6$, $R^7$, $R^8$, $R^9$, and $R^{10}$, are independently chosen from —H, —OH, and substituted or unsubstituted ($C_1$-$C_2M$)hydrocarbyl;
at least one of $R^1$, $R^4$, $R^5$, and $R^{10}$, comprises a vinyl group;
m is any positive integer;
n is zero or any positive integer; and
m and n are in random or block orientation.

3. The curable silicone composition of claim 2, wherein the vinyl polysiloxane component comprises one or more vinyl polysiloxanes independently having a structure according to at least one of Formula II and Formula III:

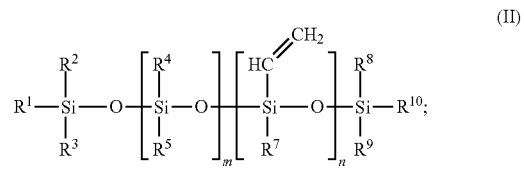

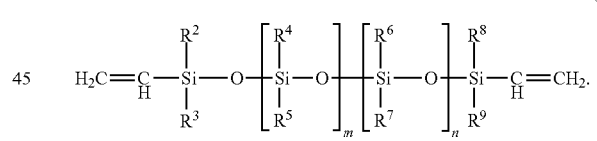

4. The curable silicone composition of claim 1, wherein the vinyl polysiloxane component comprises one or more vinyl polysiloxanes independently having viscosity in a range of from about 100 mPa-s to about 500,000 mPa-s at 25° C.

5. The curable silicone composition of claim 1, wherein the polymerization catalyst comprises platinum.

6. The curable silicone composition of claim 1, further comprising a microsphere component in a range of from about 0.05 wt % to about 10 wt % of the curable composition.

7. The curable silicone composition of claim 6, wherein the microsphere component comprises a plurality of microspheres chosen from polymer microspheres, glass microspheres, ceramic microspheres, or combinations thereof.

8. An assembly comprising:
a first substrate;
a second substrate; and a cured product of the curable composition of claim 1, in contact with the first substrate and the second substrate.

9. The assembly of claim 8, wherein the first substrate and the second substrate enclose a void defined therebetween.

10. The assembly of claim 9, further comprising an electronic component located at least partially within the void.

11. The assembly of claim 8 wherein the cured product comprises a plurality of foamed cells dispersed throughout the cured product.

12. The assembly of claim 11, wherein the plurality of foamed cells are uniformly dispersed throughout the cured product.

* * * * *

UNITED STATES PATENT AND TRADEMARK OFFICE
CERTIFICATE OF CORRECTION

PATENT NO. : 12,152,146 B2
APPLICATION NO. : 17/259015
DATED : November 26, 2024
INVENTOR(S) : Enzhong Zhang Page 1 of 1

It is certified that error appears in the above-identified patent and that said Letters Patent is hereby corrected as shown below:

In the Claims

<u>Column 36</u>
Line 23, In Claim 2, delete "unsubstituted $(C_1-C_2M)$hydrocarbyl" and insert -- unsubstituted $(C_1-C_{20})$hydrocarbyl --, therefor.

Signed and Sealed this
Third Day of June, 2025

Coke Morgan Stewart
*Acting Director of the United States Patent and Trademark Office*